(12) United States Patent
Di Pietro et al.

(10) Patent No.: US 10,356,111 B2
(45) Date of Patent: Jul. 16, 2019

(54) SCHEDULING A NETWORK ATTACK TO TRAIN A MACHINE LEARNING MODEL

(71) Applicant: Cisco Technology, Inc., San Jose, CA (US)

(72) Inventors: Andrea Di Pietro, Lausanne (CH); Jean-Philippe Vasseur, Saint Martin d'Uriage (FR); Javier Cruz Mota, Assens (CH)

(73) Assignee: Cisco Technology, Inc., San Jose, CA (US)

( * ) Notice: Subject to any disclaimer, the term of this patent is extended or adjusted under 35 U.S.C. 154(b) by 286 days.

(21) Appl. No.: 14/164,467

(22) Filed: Jan. 27, 2014

(65) Prior Publication Data

US 2015/0195145 A1    Jul. 9, 2015

Related U.S. Application Data

(60) Provisional application No. 61/923,847, filed on Jan. 6, 2014.

(51) Int. Cl.
| | |
|---|---|
| *G06N 3/02* | (2006.01) |
| *G06N 3/08* | (2006.01) |
| *G06N 20/00* | (2019.01) |
| *H04L 12/24* | (2006.01) |
| *H04L 29/06* | (2006.01) |

(Continued)

(52) U.S. Cl.
CPC ........... *H04L 63/1425* (2013.01); *G06N 3/02* (2013.01); *G06N 20/00* (2019.01); *H04L 41/16* (2013.01); *H04L 43/0876* (2013.01); *H04L 47/127* (2013.01); *H04L 47/2466* (2013.01);

(Continued)

(58) Field of Classification Search
CPC ............................... G06N 3/02; G06N 99/005
See application file for complete search history.

(56) References Cited

U.S. PATENT DOCUMENTS

| | | | |
|---|---|---|---|
| 7,526,806 B2 | 4/2009 | Wiley et al. | |
| 7,603,709 B2 | 10/2009 | Lewis et al. | |

(Continued)

FOREIGN PATENT DOCUMENTS

| | | |
|---|---|---|
| EP | 2442525 A1 | 4/2012 |
| WO | WO-02/48959 A2 | 6/2002 |

OTHER PUBLICATIONS

Douligeris, Christos, and Aikaterini Mitrokotsa. "DDoS attacks and defense mechanisms: classification and state-of-the-art." Computer Networks 44.5 (2004): 643-666.*

(Continued)

*Primary Examiner* — Alan Chen
*Assistant Examiner* — Kevin W Figueroa
(74) *Attorney, Agent, or Firm* — Behmke Innovation Group LLC; James Behnke; Stephen D. LeBarron

(57) ABSTRACT

In one embodiment, a device evaluates a set of training data for a machine learning model to identify a missing feature subset in a feature space of the set of training data. The device identifies a plurality of network nodes eligible to initiate an attack on a network to generate the missing feature subset. One or more attack nodes are selected from among the plurality of network nodes. An attack routine is provided to the one or more attack nodes to cause the one or more attack nodes to initiate the attack. An indication that the attack has completed is then received from the one or more attack nodes.

20 Claims, 14 Drawing Sheets

(51) Int. Cl.
*H04L 12/26* (2006.01)
*H04L 12/801* (2013.01)
*H04L 12/855* (2013.01)
*H04L 12/891* (2013.01)
*H04L 12/753* (2013.01)

(52) U.S. Cl.
CPC ............ *H04L 47/41* (2013.01); *G06N 3/08* (2013.01); *G06N 3/084* (2013.01); *H04L 45/48* (2013.01)

(56) References Cited

U.S. PATENT DOCUMENTS

| | | |
|---|---|---|
| 7,657,940 B2 | 2/2010 | Portolani et al. |
| 7,675,926 B2 | 3/2010 | Olsen et al. |
| 7,694,335 B1 | 4/2010 | Turner et al. |
| 7,733,798 B2 | 6/2010 | White et al. |
| 7,779,471 B2 | 8/2010 | Balasubramaniyan et al. |
| 7,793,138 B2 | 9/2010 | Rastogi et al. |
| 7,854,000 B2 | 12/2010 | Venkat et al. |
| 7,971,256 B2 | 6/2011 | Bhikkaji et al. |
| 8,032,779 B2 | 10/2011 | Clemm et al. |
| 8,121,024 B1 | 2/2012 | Natarajan et al. |
| 8,161,554 B2 | 4/2012 | Sadhasivam et al. |
| 8,230,498 B2 | 7/2012 | Shaffer et al. |
| 8,261,355 B2 | 9/2012 | Rayes et al. |
| 8,312,541 B2 | 11/2012 | Levy-Abegnoli et al. |
| 8,619,576 B2 | 12/2013 | Vasseur et al. |
| 8,634,316 B2 | 1/2014 | Rosenberg et al. |
| 2003/0023534 A1* | 1/2003 | Kadambe ............ G06K 9/6217 705/36 R |
| 2008/0083029 A1 | 4/2008 | Yeh et al. |
| 2008/0148342 A1 | 6/2008 | Aiyagari et al. |
| 2010/0082513 A1* | 4/2010 | Liu ..................... H04L 63/1458 706/46 |
| 2011/0258702 A1 | 10/2011 | Olney et al. |
| 2011/0302118 A1* | 12/2011 | Melvin ................ G06N 99/005 706/21 |
| 2012/0023572 A1 | 1/2012 | Williams, Jr. et al. |
| 2012/0026938 A1 | 2/2012 | Pandey et al. |
| 2012/0155475 A1 | 6/2012 | Vasseur et al. |
| 2012/0230204 A1 | 9/2012 | Vasseur et al. |
| 2012/0320923 A1 | 12/2012 | Vasseur et al. |
| 2013/0010610 A1 | 1/2013 | Karthikeyan et al. |
| 2013/0024560 A1 | 1/2013 | Vasseur et al. |
| 2013/0159479 A1 | 6/2013 | Vasseur |
| 2013/0159548 A1 | 6/2013 | Vasseur et al. |
| 2013/0179538 A1 | 7/2013 | Dutta et al. |
| 2013/0219046 A1 | 8/2013 | Wetterwald et al. |
| 2013/0276114 A1 | 10/2013 | Friedrichs et al. |
| 2013/0298184 A1 | 11/2013 | Ermag An et al. |
| 2014/0022906 A1 | 1/2014 | Vasseur et al. |
| 2014/0025945 A1 | 1/2014 | McGrew et al. |
| 2015/0095725 A1* | 4/2015 | Pierce .................. G06F 3/0488 714/57 |

OTHER PUBLICATIONS

Del Grosso, Concettina, et al. "Improving network applications security: a new heuristic to generate stress testing data." Proceedings of the 7th annual conference on Genetic and evolutionary computation. ACM, 2005.*

Louvieris, Panos, Natalie Clewley, and Xiaohui Liu. "Effects-based feature identification for network intrusion detection." Neurocomputing 121 (2013): 265-273. (Year: 2013).*

Bhatia, Sajal, et al. "A framework for generating realistic traffic for Distributed Denial-of-Service attacks and Flash Events." Computers & Security 40 (2014): 95-107. (Year: 2014).*

Lin, Shih-Wei, et al. "An intelligent algorithm with feature selection and decision rules applied to anomaly intrusion detection." Applied Soft Computing 12.10 (2012): 3285-3290. (Year: 2012).*

Cai, et al., "Distributed Aggregation Algorithms with Load-Balancing for Scalable Grid Resource Monitoring", Parallel and Distributed Processing Symposium, Mar. 2007, 10 pages, Institute of Electrical and Electronics Engineers.

Hwang, et al., "DHT-Based Security Infrastructure for Trusted Internet and Grid Computing", International Journal of Critical Infrastructures, vol. 2, No. 4, Nov. 2009, pp. 412-433, Inderscience Publishers.

Jover, R.P., "Security Attacks Against the Availability of LTE Mobility Networks: Overview and Research Directions", 16th International Symposium on Wireless Personal Multimedia Communications (WPMC), Jun. 2013, 9 pages, Atlantic City, NJ.

Lippmann, et al., "Analysis and Results of the 1999 DARPA Off-Line Intrusion Detection Evaluation", Proceedings of the Third International Workshop on Recent Advances in Intrusion Detection, Raid, (2000), pp. 162-182, Springer-Verlag, London, UK.

Oh, et al., "Distributed Learning in Mobile Sensor Networks Using Cross Validation" 49th IEEE Conference on Decision and Control, Dec. 2010, 6 pages, Institute of Electrical and Electronics Engineers, Atlanta, GA.

Ryan, et al., "Intrusion Detection with Neural Networks", Technical Report WS-97-07, (1997), pp. 72-77, Association for the Advancement of Artificial Intelligence.

Sommer, R., "Outside the Closed World: On Using Machine Learning for Network Intrusion Detection", IEEE Symposium on Security and Privacy, May 2010, pp. 305-316, Intitute of Electrical and Electronics Engineers, Oakland, CA.

Vasseur et al., "Computer Network Anomaly Training and Detection Using Artificial Neural Networks", U.S. Appl. No. 61/923,847, filed Jan. 6, 2014, 166 pgs., U.S. Patent and Trademark Office, Alexandria, Virginia.

Vasseur, et al., "Routing Metrics Used for Path Calculation in Low-Power and Lossy Networks", Request for Comments 6551, Mar. 2012, 30 pages, Internet Engineering Task Force Trust.

Viola, et al. "Rapid Object Detection Using a Boosted Cascade of Simple Features", Proceedings of the 2001 IEEE Computer Vision and Pattern Recognition, vol. 1, (2001), 8 pages, Institute of Electical and Electronics Engineers.

Winter, et al., "RPL: IPv6 Routing Protocol for Low-Power and Lossy Networks", Request for Comments 6550, Mar. 2012, 157 pages, Internet Engineering Task Force Trust.

Zinkevic, et al., "Parallelized Stochastic Gradient Descent", Proceedings of the Advances in Neural Information Processing Systems 23 (2010), 37 pages.

* cited by examiner

SCHEDULING A NETWORK ATTACK TO TRAIN A MACHINE LEARNING MODEL

RELATED APPLICATIONS

This application claims priority to U.S. Provisional Application No. 61/923,847, filed Jan. 6, 2014, entitled: COMPUTER NETWORK ANOMALY TRAINING AND DETECTION USING ARTIFICIAL NEURAL NETWORKS, by Vasseur, et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, and association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely on one or more ML techniques for performing a task for which they have not been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
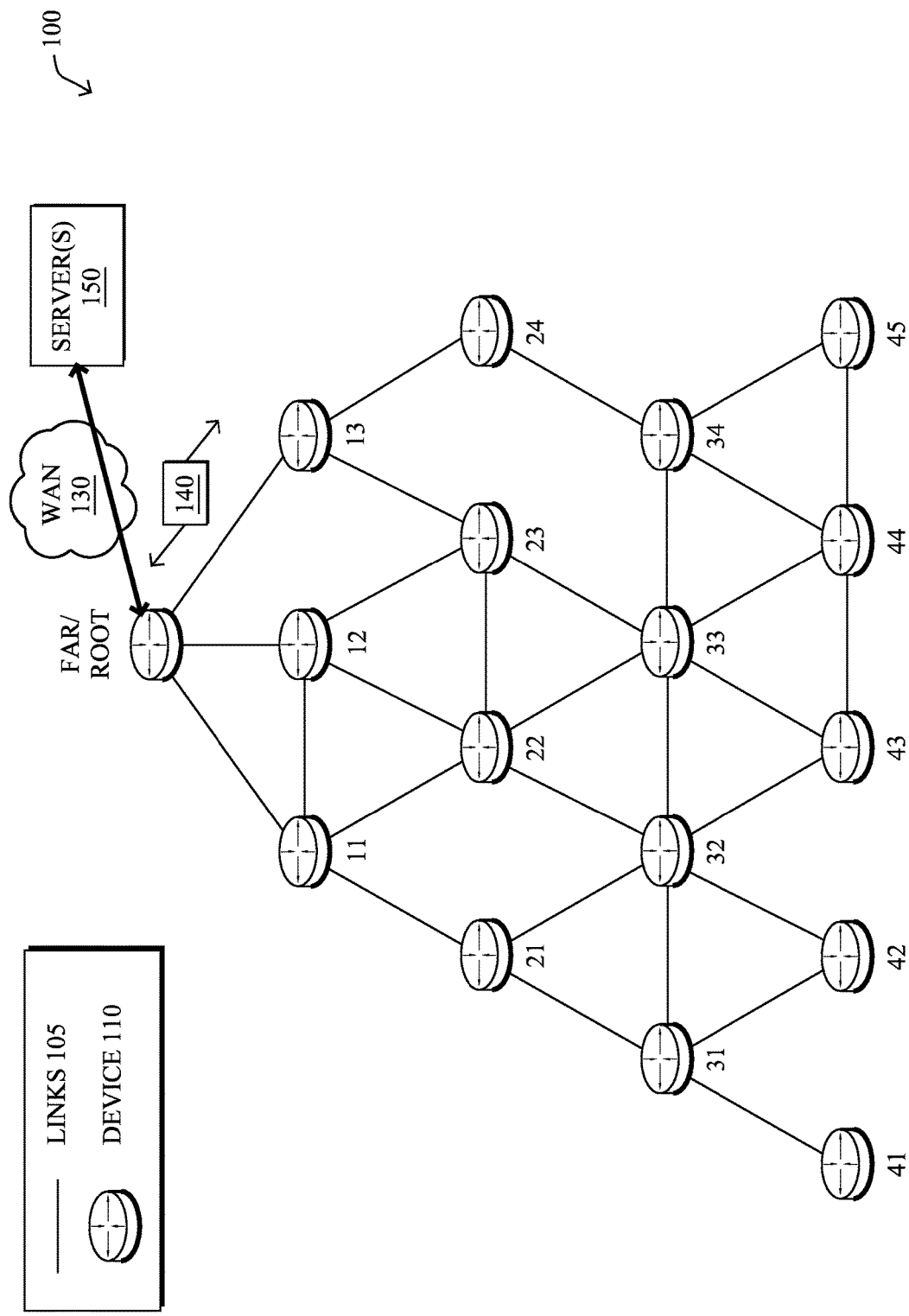
FIG. 1 illustrates an example communication network.

According to one or more embodiments of the disclosure, a device evaluates a set of training data for a machine learning model to identify a missing feature subset in a feature space of the set of training data. The device identifies a plurality of network nodes eligible to initiate an attack on a network to generate the missing feature subset. One or more attack nodes are selected from among the plurality of network nodes. An attack routine is provided to the one or more attack nodes to cause the one or more attack nodes to initiate the attack. An indication that the attack has completed is then received from the one or more attack nodes.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications), temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
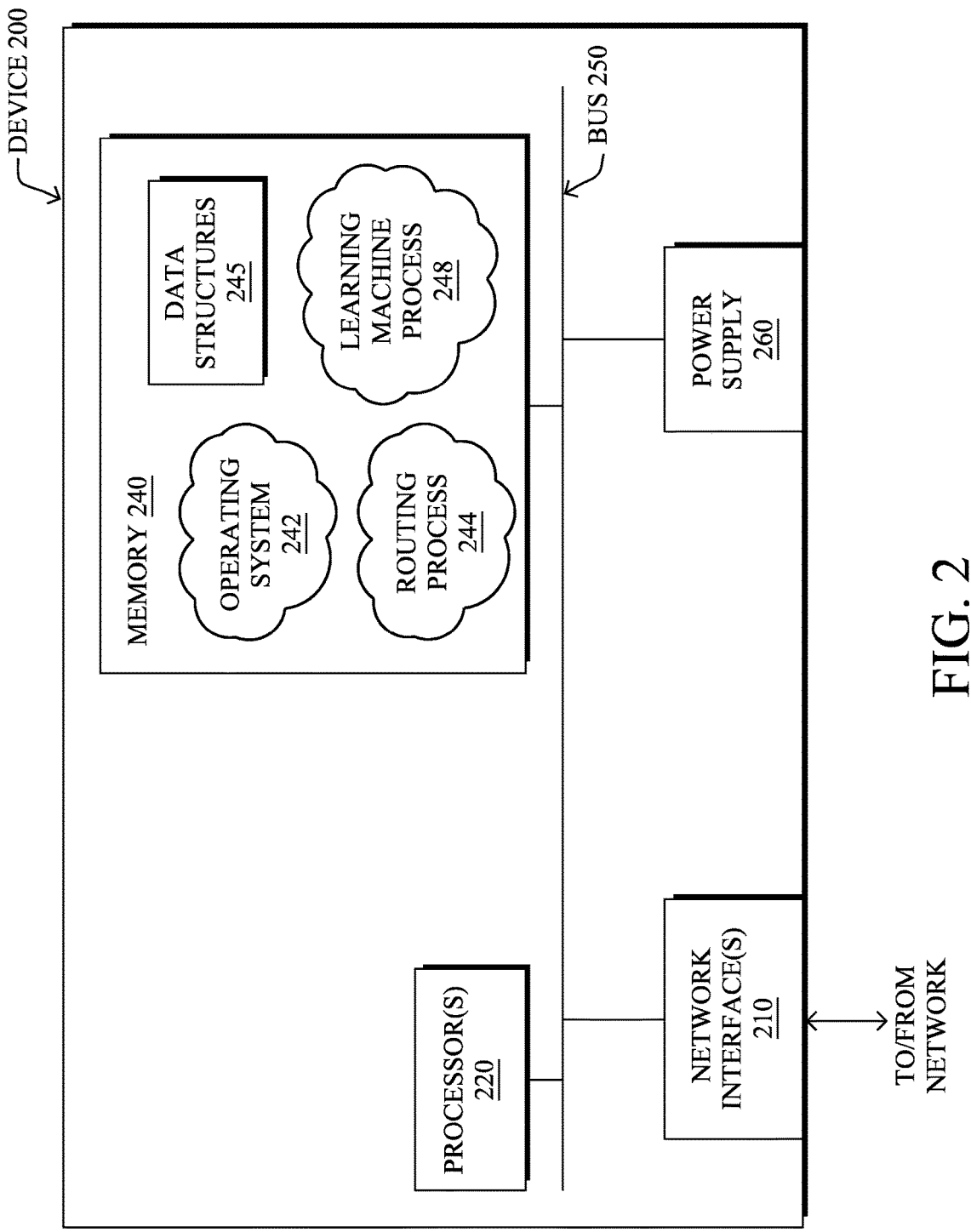
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating systems 242, portions of which are typically resident in memory 240 and executed by the processor, functionally organizes the device by, inter alia, invoking operations in support of software processes and/or services executing on the device. These software processes and/or services may comprise routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols, as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnects are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward, and terminating at, one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
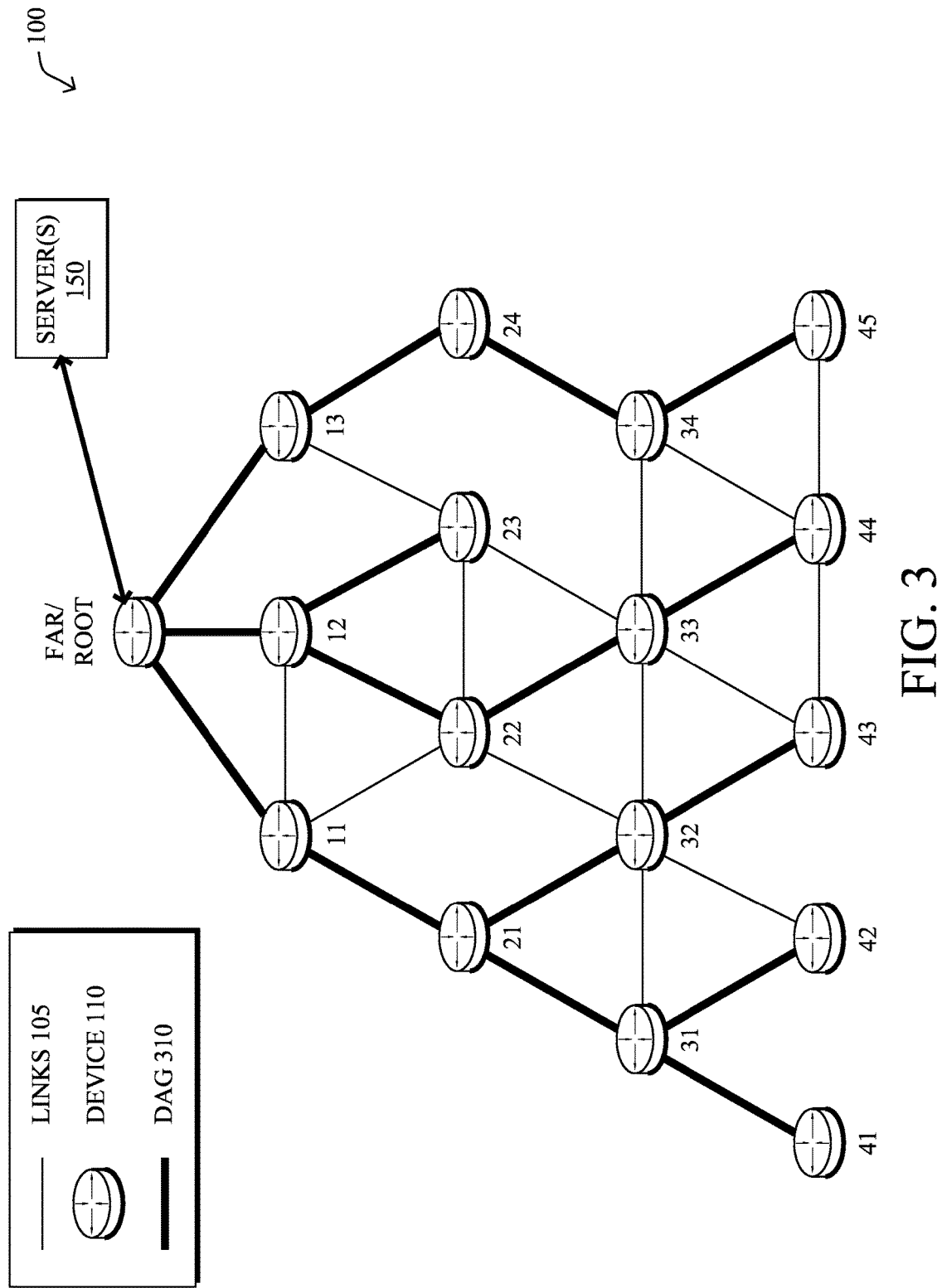
FIG. 3 illustrates an example directed acyclic graph (DAG) in the communication network of FIG. 1.
Figure 4A:
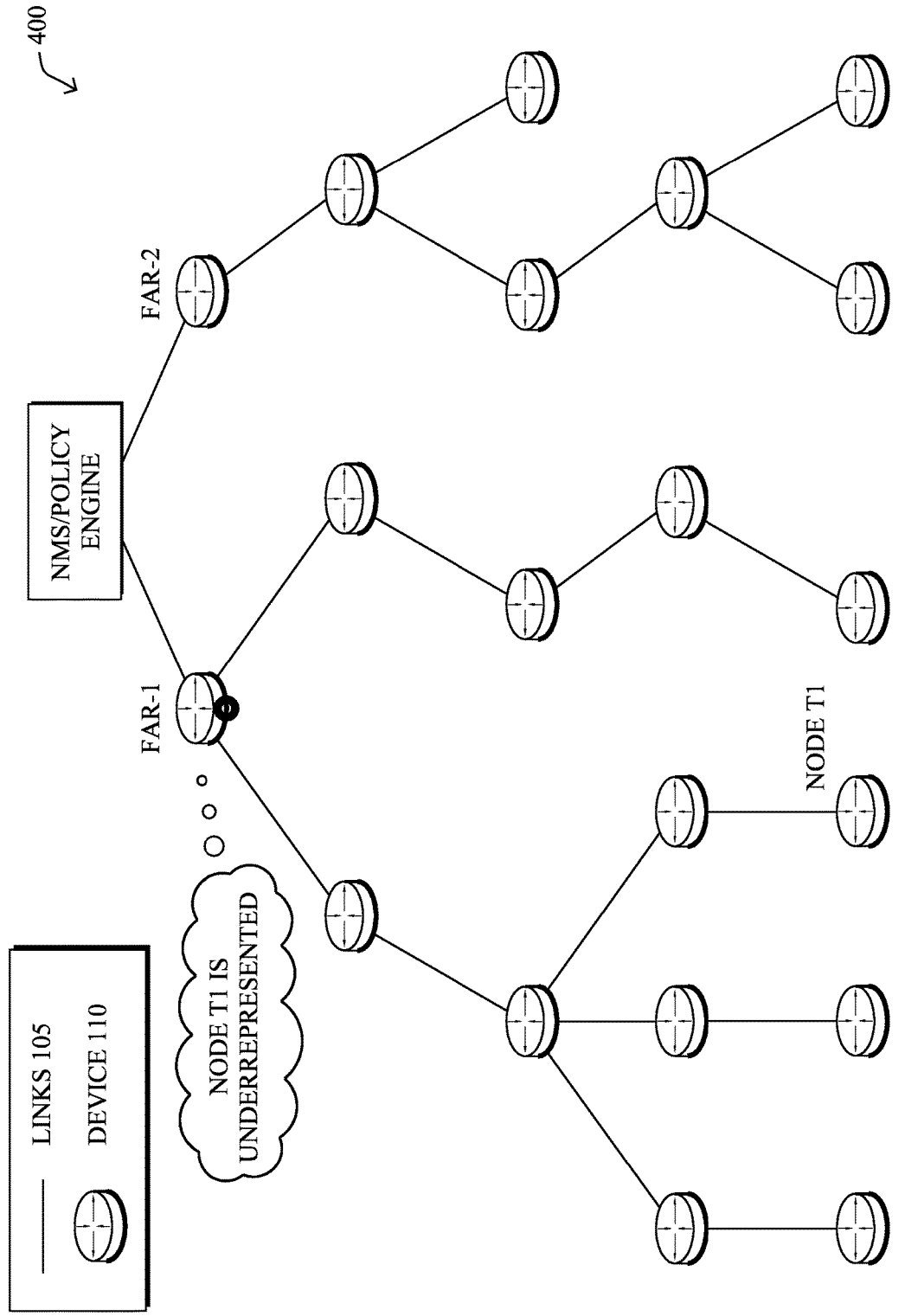
FIGS. 4A-4D illustrate an example of a network attack being performed.
Figure 4B:
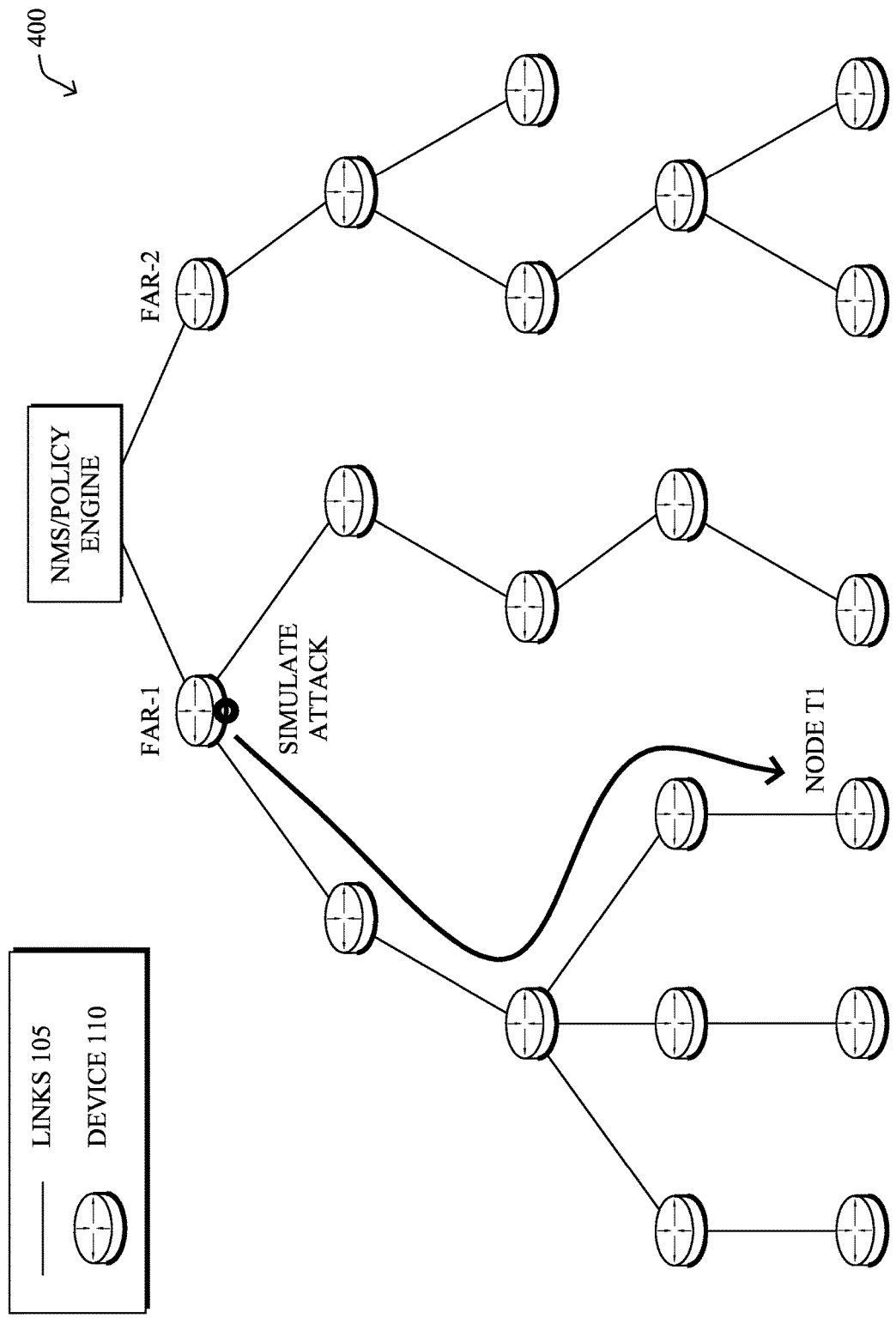
Figure 4C:
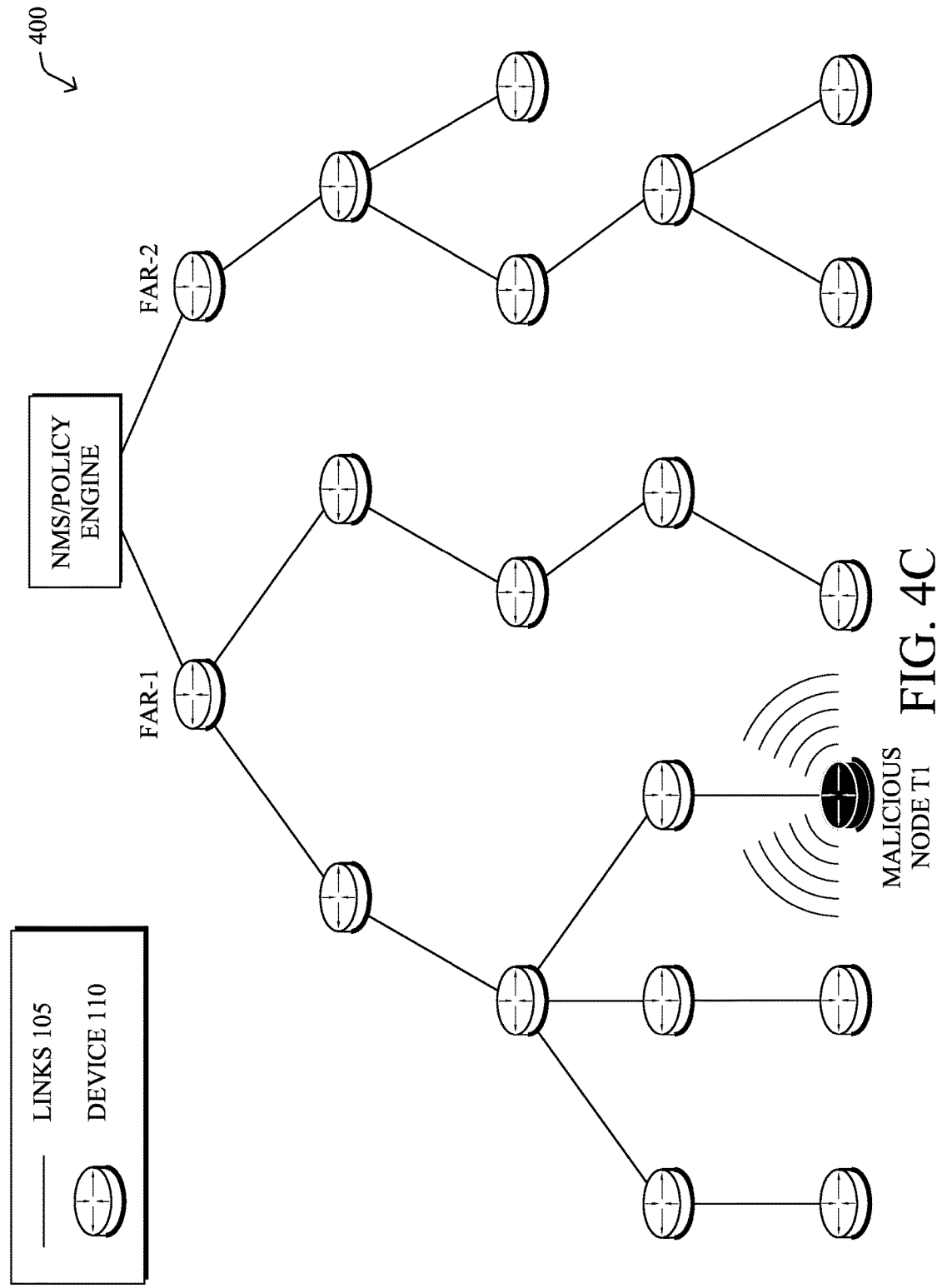
Figure 4D:
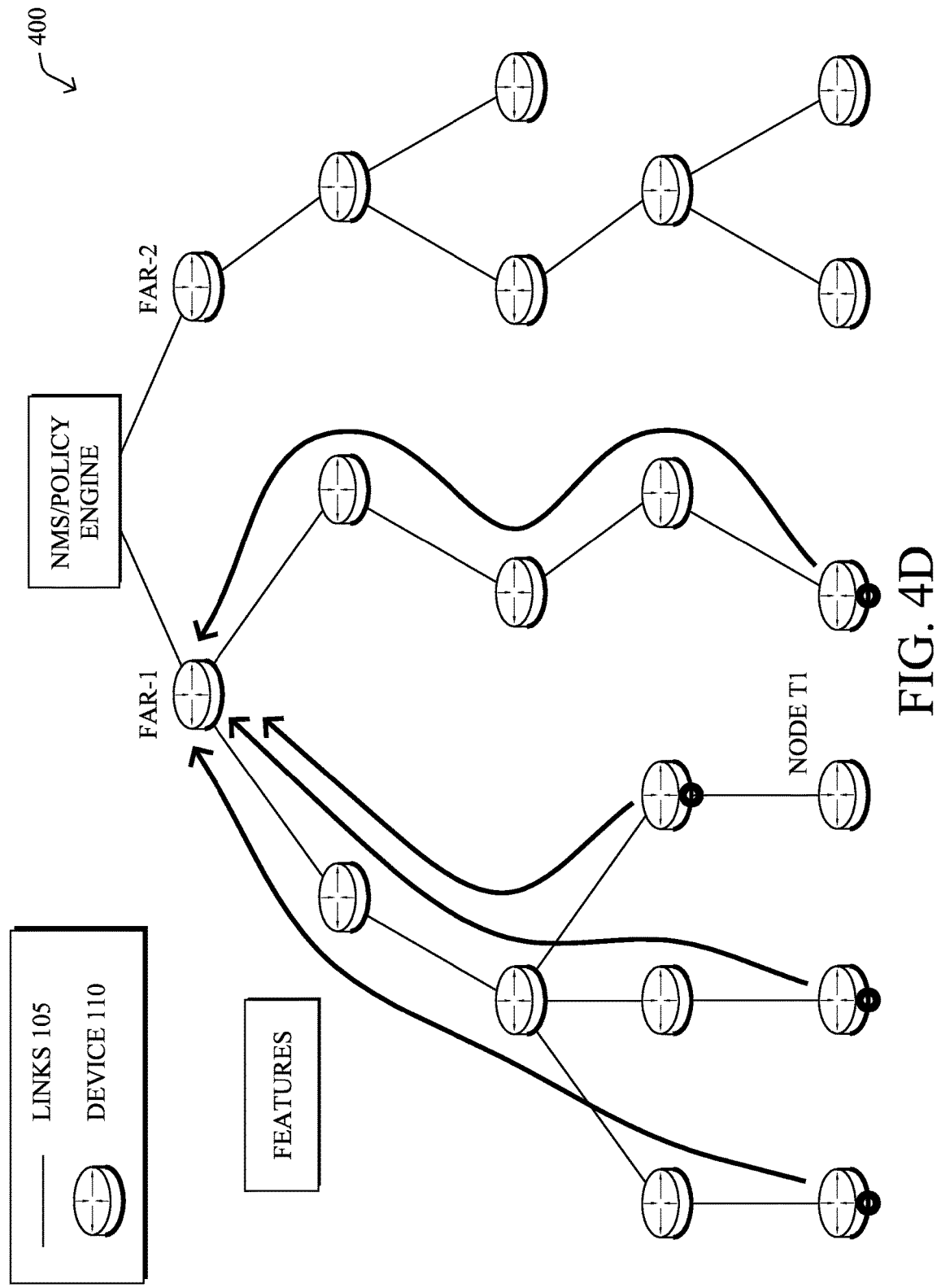

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

RPL supports two modes of operation for maintaining and using Downward routes:

1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams. Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely on one or more ML algorithms for performing a task for which they have not been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficient management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

Artificial Neural Networks (ANNs) are a type of machine learning technique whose underlying mathematical models were inspired by the hypothesis that mental activity consists primarily of electrochemical activity between interconnected neurons. ANNs are sets of computational units (neurons) connected by directed weighted links. By combining the operations performed by neurons and the weights applied by their links, ANNs are able to perform highly non-linear operations on their input data.

The interesting aspect of ANNs, though, is not that they can produce highly non-linear outputs of the input. The truly interesting aspect is that ANNs can "learn" to reproduce a predefined behavior through a training process. This capacity of learning has allow the successful application of ANNs to a wide variety of learning problems, such as medical diagnostics, character recognition, data compression, object tracking, autonomous driving of vehicles, biometrics, etc.

Learning in ANNs is treated as an optimization problem where the weights of the links are optimized for minimizing a predefined cost function. This optimization problem is computationally very expensive, due to the high number of parameters to be optimized, but thanks to the backpropagation algorithm, the optimization problem can be performed very efficiently. Indeed, the backpropagation algorithm computes the gradient of the cost function with respect to the weights of the links in only one forward and backward pass throw the ANN. With this gradient, the weights of the ANN that minimize the cost function can be computed.

Denial of service (DoS) is a broad term for any kind of attack aiming at, by any means, making a particular service unavailable (be it a certain application running on a server or network connectivity itself). This is usually performed by bringing the target's resources to exhaustion (again, target resources may range from bandwidth to memory and CPU).

In greater detail, a DoS attack may consist in flooding a target network with hundreds of megabits of traffic (volume based DoS), exhausting a server state by opening a large number of TCP connections (SYN flooding), or by making an HTTP server unavailable by sending it an overwhelming number of requests. An attack may be more subtle and exploit well-known vulnerabilities in the target system (e.g. a large number of fragmented IP packets may exhaust the resources of a router).

Nowadays, DoS attacks are mostly distributed, i.e., they are carried out by multiple sources at the same time, thus making it more difficult to track. In many cases, botnets (i.e. armies or infected hosts spread across the network and under the control of a single master) are used for mounting DoS attacks. In addition, source addresses used for attacks can be spoofed, so that blocking an offending address is potentially useless.

In general, DoS attacks are easy to detect when they are brute-force, but, especially when highly distributed, they may be difficult to distinguish from a flash-crowd (i.e. an overload of the system due to many legitimate users accessing it at the same time).

Statistics and machine learning techniques have been proposed for detecting attacks at the server or network level. Some approaches try to analyze changes in the overall statistical behavior of the network traffic (e.g. the traffic distribution among flow flattens when a DDoS attack based on a number of microflows happens). Other approaches aim at statistically characterizing the normal behaviors of network flows or TCP connections, in order to detect significant deviations.

However, the Internet of Things (IoT) represents a completely different scenario and requires novel detection and reaction strategies. Its highly distributed nature implies that there is no central vantage point from which an attack can be observed. In addition, the scarce resources of the IoT force reporting from the nodes to a central location to be reduced to a minimum.

On top of the lack of global information, detecting DoS in the IoT is made harder by the fact that a much more subtle interference of the network's operations may be enough to bring the network down. For example, a jamming node can prevent a node from decoding traffic by just emitting short bursts when activity on the channel is detected. This can isolate a large portion of the network which uses that node as a parent and cut off a large portion of the network. In addition, in the case of battery operated nodes, a slow but steady flow of malicious traffic can exhaust a node's battery, thus making the node useless in a matter of days.

Due to the high variability of this kind of network, the symptoms of those attacks are not easy to detect and can be lost in the normal noise of the network behavior (traffic peaks and topology changes are quite normal in LLN). Therefore, an intelligent approach is needed that is able to reveal subtle changes in the measured data that are typical of a known anomalous behavior.

—Possible Attacks Against IoT—

Even though the existing literature regarding possible attack types against the IoT is limited, a number of attacks against sensor network technologies may apply with a few minor modifications. Such attacks can be roughly classified into two classes: 1.) insider attacks (i.e., where the malicious node needs to be authenticated and be in possession of the network encryption keys), and 2.) outsider attacks (i.e., where the attacker just needs to be within the radio range of the victims).

In particular, a number of attacks against routing performed by a malicious node in the DAG can be imagined. A node can, for example, perform selective forwarding. In other words, the node could just discard some of the traffic messages that it is asked to forward, while still participating correctly within the routing protocol. Although this can potentially be revealed by end-to-end mechanisms, detection of this type of attack can be difficult and slow due to the low traffic rate and lossiness of IoT networks. Other example attacks include a malicious node impersonating multiple identities or advertising forged routing information, so as to gain a central role in the routing topology.

While attacks belonging to the former class can be prevented through well-designed cryptography and authentication, in the latter case they have to be detected by monitoring the network environment.

The simplest form of attack that can be performed against an RF network is jamming. This consists in artificially creating an interference, so as to prevent message decoding. There are several variations of a jamming attack, with different degrees of complexity and subtlety. The attacker can continuously emit power on the spectrum (continuous jamming), create a collision when it detects activity on the channel (reactive jamming), or attack only a particular type of traffic (selective jamming). The damage from a jamming attack can be maximized if the attacker is able to estimate the centrality of a node in the routing topology. This can be obtained by accounting for the amount of traffic transmitted and received by each node, by leveraging the fact that the link layer addresses are in clear. Once the jammer has detected the most central node, it can try to make this node unreachable for its descendants, which will in turn be forced to select another parent. This can potentially create continuous route oscillations and convergences.

Other kinds of external DoS attacks can be performed by exploiting the fact that a number of messages in the WPAN do not need authentication, such as discovery beacons and some of the EAPoL messages used for authentication. In particular, discovery beacons can be used for injecting false synchronization information into the network, so as to prevent two nodes from meeting on the right unicast communication frequency. EAPoL authentication messages, instead, have to be relayed by the WPAN nodes up to the FAR, and from there until the AAA server. This mechanism allows an attacker to generate routable traffic, thus flooding the network and wasting bandwidth and processing power. A mitigation strategy may to have authentication requests be rate-limited. However this may result in legitimate nodes being prevented from authenticating when an attack is in progress.

Other attacks can be performed against networks that use the 802.11i protocol, which is used for exchanging key information between the authenticating node and the FAR (and therefore, cannot be protected by link layer encryption). Such attacks are documented in the scientific literature and aim at blocking the handshake between the client and the access point. This can be achieved by an attacker by interleaving a forged message between two messages in the handshake. This implicitly resets the handshake state, so that subsequent messages from the authenticating node are discarded.

—Frequency-Hopping and Synchronization in 802.15.4—

In a channel-hopping mesh network, devices communicate using different channels at different times. To communicate a packet, a transmitter-receiver pair must be configured to the same channel during packet transmission. For a transmitter to communicate with a receiver at an arbitrary time in the future, the transmitter and receiver must synchronize to a channel schedule that specifies what channel to communicate on and at what time. Channel schedules may be assigned to each transmitter-receiver pair independently so that neighboring transmitter-receiver pairs can communicate simultaneously on different channels. Such a strategy increases aggregate network capacity for unicast communication but is inefficient for broadcast communication. Alternatively, all devices in a network may synchronize with a single channel schedule such that all devices transmit and receive on the same channel at any time. Such a strategy increases efficiency for broadcast communication since a single transmission can reach an arbitrary number of neighbors, but decreases aggregate network capacity for unicast communication since neighboring individual transmitter-receiver pairs cannot communicate simultaneously without interfering. Mesh networks typically utilize both unicast and broadcast communication. Applications use unicast communication to communicate data to a central server (e.g. AMI meter reads) or configure individual devices from a central server (e.g. AMI meter read schedules). Network control protocols use unicast communication to estimate the quality of a link (e.g. RSSI and ETX), request configuration information (e.g. DHCPv6), and propagate routing information (e.g. RPL DAO messages). Applications use multicast communication for configuring entire groups efficiently (e.g. AMI meter configurations based on meter type), downloading firmware upgrades (e.g. to upgrade AMI meter software to a newer version), and for power outage notification. Network control protocols use multicast communication to discover neighbors (e.g. RPL DIO messages, DHCPv6 advertisements, and IPv6 Neighbor Solicitations) and disseminate routing information (e.g. RPL DIO messages). Existing systems optimize for both unicast and broadcast communication by synchronizing the entire network to the same channel-switching schedule and using a central coordinator to compute and configure channel schedules for each individual device, or else more efficiently optimizing for both unicast and broadcast communication in a channel-hopping network without need for centrally computing schedules for individual nodes.

In order to join the WPAN enabled with frequency hopping (e.g., an 802.15.4 WPAN), a node needs to synchronize on the frequency hopping schedule of its neighbors. Therefore, each node in the WPAN broadcasts its unicast reception schedule via a discovery beacon, which is not encrypted and sent on every frequency: this allows nodes joining the PAN to join. In greater detail, the discovery beacon message is sent a broadcast destination WPAN and includes several information elements, most notably:

The WPAN SSID string

The unicast scheduling information. In one implementation, this is made up of a slot number and an offset value. This allows the receiving node to compute the slot number the sending node is currently is, and thus, by applying a hash function, to know its current receiving frequency. Note that this algorithm does not require the clocks of the two nodes to be synchronized.

The transmission of a discovery beacon is triggered by an associated trickle timer. However, the information about the scheduling of the broadcast slot is not included in such a beacon, but only in the synchronous and unicast beacons, which are encrypted with the network key. In particular, the synchronous beacon is triggered by a trickle timer and it is sent on every frequency (just as the discovery beacon). The unicast beacon, on the contrary, is sent upon request by another node by using a standard unicast transmission. In both cases, the beacon includes a broadcast scheduling information element, which has the same format of the unicast scheduling IE (Information Element). As a consequence, an attacker can interfere with its target during its unicast slot, but ignores the broadcast frequency schedule: the broadcast schedule is therefore much better protected against DoS attacks.

—802.15.4 Security—

Currently, IoT architecture comes with several embedded security mechanisms. The cornerstone of IoT security is indeed link layer encryption, which is mandatory for most frames (including routing messages and application traffic). Besides pure encryption, link layer security ensures message integrity (through an encrypted MAC code) and message non-replication (through an encrypted sequence number included in the encrypted message payload).

In order to install the necessary link layer keys on every node, an authentication procedure is carried out when the node joins the network. Such a procedure is based on the EAPOL protocol, which is carried directly over layer 2 messages and is used for transporting authentication data from the node to the FAR (notice that such messages are not encrypted). On top of EAPOL, two main protocols are carried: EAP messages, which the FAR tunnels to an AAA server through the RADIUS and 802.11i messages, which are used for exchanging cryptographic material between the FAR and the node.

In greater detail, EAP messages are used by the node for mutual authentication with the AAA server and securely agree on a shared secret; to this end, a complete TLS handshake is, in turn, tunneled over EAP messages and a public key mechanism based on X509 certificates is used for identity validation. Once such shared secret has been established, the AAA server transmits it to the FAR, which, in turn, uses it for exchanging the link layer keys with the node through the 802.11i protocol.

Notice that the shared secret negotiated through EAP is stored by the node in persistent memory and can be reused for subsequent authentication (in this case, EAP is skipped and the link layer key is directly exchanged through 802.11i).

Scheduling a Network Attack

There are situations where it is necessary or helpful to generate controlled attacks in a network. An example objective of generating these attacks is to collect data about their impact on the network, in order to use this data for training a Learning Machine (LM) capable of detecting uncontrolled attacks. This can be treated as a classification problem where samples of communication features of the network are classified into either "Normal" or "Attack" classes.

Classification may be performed by training a classifier using a supervised or semi-supervised approach, i.e., using a dataset of labeled or partially labeled observations as input for the training of the LM. A wide range of Machine Learning (ML) approaches can be used for this purpose, but a critical point in all of them is the training dataset. For training a robust and generalizable classifier, the training dataset must have enough variability in the feature space. A feature in LM terms generally refers to a network attribute, when the LM is trained using network data. To ensure variability in the feature space, the feature values used for training must correctly sample the feature space, in the sense that when the classifier will be used for classifying unknown data, the features of this data have to be inside the feature space considered during training.

An easy way of understanding the considerations in training a classifier is highlighted in the following example. Imagine that a classifier that says whether a human being will like a certain type of breakfast cereal is to be trained (i.e., a given person is classified as either liking the cereal or not liking the cereal). To train this classifier, you collect and label data of different kinds of cereals according to the likings of a group of people. If, for instance, the population considered for the training only contains people that are 16 years old or younger, you cannot expect a good performance of the classifier when used to classify the likings of a person who is 60 years old, for instance.

In the techniques described herein, an efficient way of selecting a target node of a jamming attack is proposed, in order to collect data that correctly samples the feature space. This selection takes into account information such as training data that has already been collected, the current load of the network, the logical structure of the network, the node characteristics, defined policies for maximizing the amount of variability in the training set, and/or other such information. For example, when requiring a node to become a jammer (i.e., a malicious node that performs a jamming form of attack), where to perform the controlled jamming may be carefully selected in order to cover the proper feature space. Furthermore, the techniques herein allow for the coordination of target selections performed by two or more routers, which avoids any potential conflicting choices in attackers. Uncoordinated attacks by two or more attackers may result in learning incorrect data sets for training or, in the worst case, not work at all. As will be appreciated, while the techniques are described herein primarily in the context of the IoT, the techniques are also applicable to non-IoT cases. Furthermore, the type of attack or other network condition and the LM used to detect the condition in the examples below are not intended to be limiting. For example, while the specific examples herein generally involve performing a controlled jamming attack, other types of network events or conditions may be initiated in a similar manner to train a LM to detect the presence of a particular event or condition.

Said differently, the techniques herein specify a distributed mechanism for determining which nodes in a network should be selected in order to trigger controlled attacks, particularly with the objective of training a LM, such as an ANN. The techniques described below specify the methodology to select these nodes that is used by a router in the network, while also taking into account policy management. The mechanism may also be extended to the case of multiple routers triggering remote control attacks, in order to perform distributed and synchronized remote attacks in the network.

Notably, LM classifiers are used in numerous applications, such as video tracking, speech recognition, handwriting recognition, search engines, computational genomics, etc. The techniques used for building and training a classifier are a main factor of the quality of the obtained classifier, but the data used for its training is also a major consideration. In particular, the quality of the data in a training set is typically more important than the quantity of data. For this reason, when there is flexibility in the data collection and/or the training, techniques for maximizing the quality of the final classifier are taken into account. If there is flexibility in the collection of data, techniques to optimally design experiments can be applied. In such a case, a predefined statistical criterion may be used to optimally design experiments. In general, these techniques to minimize the amount of data and/or observations required while maximizing the amount of knowledge in the whole dataset. If the training dataset is already collected, active learning techniques can be used for only taking into account the samples in the dataset that provide new information. In contrast, the techniques herein determine the most useful nodes (i.e., in terms of features) for training with their data a LM, with coordination between nodes triggering the action that will generate the data collection.

Using LMs to detect attacks in constrained networks, such as LLNs, also differs significantly from traditional networks, such as IP networks. In IP networks, for example, LMs may be trained by using captured traces of past attacks that have been collected on other networks (e.g., the DARPA traces are an example of such a dataset that widely used in academia). However, the use-case of traditional IP network shows significant differences with respect to LLNs. In particular:

Traditional IP networks usually offer a few vantage points where the attack can be witnessed and recorded. As opposed to that, the highly distributed nature of LLN makes it difficult to continuously collect network data and eventually collecting attack data. Besides, LLN being a relatively recent technical field, the amount of collected information about associated attacks is much scarcer.

In LLNs, due to their exposure to the physical environment and their very large scale, the variability of the effects the same attack can cause is much wider. For example, the witnessed effect of a jammer targeting a node on a sparse edge of the network can be much different with respect to the same attack when performed in a central, node-dense area. Therefore, LLN requires a much more thorough exploration of the attack space, in order to be able to train a LM to recognize every possible variation of an attack.

Existing solutions to initiate a jamming attack do not use a standard off-the-shelf node, but they either modify it physically (e.g., by adding an extra antenna) or by using software-defined-radios to implement the RF section.

The jammers in existing techniques may also not be legitimate members of the network (e.g., external equipment for testing). Therefore they have to be physically moved around the physical locations of the WPAN in order to obtain a data-set covering the whole feature space.

Further, controlled jammers may not be able to synchronize on the target's frequency hopping schedule.

Operationally, as illustrated in the examples of FIGS. 4A-4D, the techniques herein combine the ability of turning a regular node into a jammer, with advanced techniques in data collection for variability maximization. The objective is to collect data with the maximum of variability in the feature space, which is achieved by triggering controlled attacks in well-chosen places of the network. In particular, the techniques herein may be used to select and coordinate the generation of controlled jamming with maximization of the variability of the dataset.

Specifically, according to various embodiments herein, a device evaluates a set of training data for a machine learning model to identify a missing feature subset in a feature space of the set of training data. The device identifies a plurality of network nodes eligible to initiate an attack on a network to generate the missing feature subset. One or more attack nodes are selected from among the plurality of network nodes. An attack routine is provided to the one or more attack nodes to cause the one or more attack nodes to initiate the attack. An indication that the attack has completed is then received from the one or more attack nodes.

Note that although the techniques herein are described in the context of a distributed DoS (DDoS) attack by means of jamming signals, they apply to any kind of attack against a network, as far as the ability for controlling the generation of the attack is maintained.

According to various embodiments, the techniques herein generally involve three aspects: candidate selection, selection sharing between different routers, and candidate query. As used herein, the term "router" is intended to generically refer to a field area router (FAR), network switch, or other such device.

First, the following elements are defined as follows:

F denotes the set of features that are collected and |F| is the number of features that form this set, i.e., $F=\{F_1, F_2, \ldots, F_{|F|}\}$.

D denotes the collected dataset and |D| is the number of samples in this dataset. Note that each sample in D is a vector with a value of $F_1, F_2, \ldots$ and $F_{|F|}$.

N denotes the set of nodes in the network and |N| is the number of nodes in this set, i.e., $N=\{N_1, N_2, \ldots, N_{|N|}\}$.

C denotes the set of candidate nodes in the network that should be attacked and/or initiate an attack for collecting data and |C| is the number of candidates in this set, i.e. $C=\{C_1, C_2, \ldots, C_{|C|}\}$.

—Candidate Selection—

In a first aspect, target and/or attacker candidates in N are dynamically selected. Target candidates may be selected according to the characteristics of the features that they provide, with the objective of maximizing variability of the collected dataset. Similarly, attacker candidates may be selected based on the features provided by targets that would be affected by an attack.

Step 1:

During a period of time T1, when no or only minimal data has been collected yet, the dynamic selection of target and/or attacker candidates may just involve randomly choosing candidate nodes. In one embodiment, the time period may be a configurable parameter and can be adjusted. In other words, if the existing dataset is too small or nonexistent, any new information is considered useful and therefore any node in N can be chosen as target and/or attacker.

Step 2:

For every feature $F_i$ in F, two normalized histograms of already collected values may be maintained by the FAR. The first histogram considers data coming from nodes that are not attacked, and the second histogram considers data from attacked nodes. Notably, both histograms may include data from a single node from different points in time (i.e., from when the node is attacked and from when the node is not attacked). The number of bins in these histograms can also be freely configured, in some cases. Thus, target and/or attacker selection may be based on the features maintained by the FAR or other network device, so as to generate missing points in the feature space of the model training data (i.e., a subset of the feature space that is missing or underrepresented).

In particular, suppose that the router receives a sample of features coming from a node under normal conditions, i.e., that it is not being attacked. In such a case, the following operations may be performed by the FAR or other device:

For every received feature $F_i$, take the value of the bin where the newly received feature would be added (e.g., in the histogram that corresponds to the feature under normal conditions). This value is denoted as $b\_\{Fi\}$.

Compute the score of every received feature as $s\_\{F_i\}=1-b\_\{F_i\}$, i.e., the score of a received feature is a value inversely proportional to the density of the histogram of observations at this point. Here, the difference with respect to the maximum value is used. In other embodiments, any other monotonic function can be considered.

Compute the score of the node ($N_j$) that sent the new sample of features as $S\_\{N_j\}=(1/|F|)*(s\_\{F_1\}+s\_\{F_2\}+\ldots+s\_\{F_{|F|}\})$, i.e., as the mean score among the received features.

If $S\_\{N_j\}$ is higher than a predefined threshold, for instance $1/|F|$, the node $N_j$ is added to the list of candidates C and the received sample of data is temporally stored.

If a certain period of time since the last trigger of an attack has passed or a certain number of candidates have been already added to the list, the list of candidates is checked for network conditions availability and then shared with other routers, as detailed further below.

The objective at this point is to trigger attacks on nodes whose features have a poor representation in the collected set until now (i.e., to "fill in" a missing or underrepresented portion of the collective feature space). This may be achieved by scoring nodes according to the density of a per-feature normalized histogram maintained by the router. Indeed, the higher the number of features received on a particular region of the feature space, the lower the score applied to this node. Then, only nodes with a high score, which means a poor representation of their features in the collected set, are proposed as candidates to be under a future attack.

When the received sample comes from a node under attack, similar operations are performed:

For every received feature $F_i$, take the value of the bin where the newly received feature would be added, in the histogram that corresponds to this feature under attack (i.e., $b\_\{F_i\}$).

Compute the score of every received feature as $s\_\{F_i\}=1-b\_\{F_i\}$.

Compute the score of the node ($N_j$) that sent the new sample of features as $S\_\{N_j\}=(1/|F|)*(s\_\{F_1\}+s\_\{F_2\}+ \ldots +s\_\{F_{|F|}\})$.

If $S\_\{N_j\}$ is lower than a predefined threshold, for instance 1/|F|, the attack to this node is stopped.

Histograms of features under attack are updated with the data from the received sample.

Unfortunately, not all of the features can be continuously monitored by the router. For example, local message transmission and reception statistics are usually only known to the node itself, which needs to export these statistics on purpose for the router to be able to monitor this information. In this case, the node may be aware of the histogram structure as used by the router (e.g., number of bins, range of interest, etc.) and notify the router just in case its features change substantially (e.g., by falling into a different bin). This allows the router to be notified when another potentially interesting point in the feature space is available, without having the nodes continuously flooding the network with reports. As a further optimization, a node could keep track of the bin variation it has already reported. For example, if features observed by a node may keep oscillating between two different bins of the histogram, the node may avoid reporting a feature change at each oscillation. Efficient data structures, such as Bloom filters, can also be used to keep track of the sent variation with negligible resource consumption.

Step 3:

At this stage, the list of candidates C may be filtered out to remove certain candidate nodes. This filtering may take into account parameters such as the node's attributes (e.g., CPU, memory, etc.), network conditions (e.g., traffic, etc.), etc. In the case of RPL, the node routing metrics as specified in IETF RFC6551 may be used to filter candidates, where a new configurable bit "A" is defined that specifies whether the node can be used as an attacker. The new list is illustratively called C'. The techniques herein also specify a new component whereby the list of candidates is further provided to a policy engine, which can either be co-located or remote to the device that identifies target and/or attacker candidates. If the policy engine is co-located with the selecting router, a check may be performed to determine if all candidates can indeed be used to perform the required actions. For example, the selecting node may further filter the list of candidates (e.g., to form a subset C" of C') based on the activity of the node (e.g., if the selecting device is co-located with an engine that computes the traffic matrix), centrality of a candidate node (e.g., as reported by the routing protocol that indicates the consequences for a node to stop routing traffic and become an attacker), etc. If the policy engine is a remote device, a newly defined IPv6 unicast message (e.g., such as a CoAP message) may be sent to the policy engine that specifies the list of candidates. The policy engine then returns a reply that may include the list of candidates C" (e.g., a subset of C'), network policies (e.g., allowing the selecting node to perform the policy filtering, and/or additional information). For example, the policy engine may indicate that a node $N_i$ is a candidate but only for specific set of attacks or during a specific period of time (e.g., between 3:00 and 4:00 am, when the node is not performing other critical task). Once the controller has received a list of suitable candidates, it may also query a subset of the suitable candidates to check whether it is possible to take them off the network with no excessive side effects on the network performance (e.g., a candidate attacker that is critical to the routing structure of the network may not be selected as an attacker).

Again, with reference to a jamming attack, the controller or router will have to create a list of nodes in the network which are link layer neighbors of the attack target and are able to reach it with a sufficiently strong signal. Such information may be retrieved by the device in charge of computing the candidate list. To this end, the device may request the neighbor tables from the nodes at a 1-hop distance from the target and used as part of the attacker selection.

Any temporally stored data from a node that is removed from the set C may also be removed from consideration. In one embodiment, the data stored in the histograms can be removed periodically and the procedure restarted. For example, after a predefined period of time T, the histograms can be emptied and then the procedure sent back to step 1 above. This assures that new data is still collected after long periods of operation, which may avoid the aging of collected data and the consequent loss of performance of the classifier trained using it.

Step 4:

In this step, multi-router synchronization may be performed. In a large network, several routers may perform similar tasks consisting of triggering remote attacks on remote nodes. For example, two routers R1 and R2 may trigger attacks on two adjacent nodes, thus leading to generating incorrect datasets (i.e., by cross contaminating the feature data generated as a result of the controlled attacks). Thus, according to a third aspect of the techniques herein, controlled attacks used to generate model training data may be synchronized.

For the sake of illustration, as shown in (and with general reference to) FIGS. 5A-5F, if FAR-1 and FAR-2 select the nodes 23 and 24 as remote jammer respectively, they may end up attacking the same node 12. Another scenario might be that 23 and 24 may decide to attack nodes 12 and 13 respectively, still leading to interferences during the learning process (training of the ANNs or other LMs hosted on the FARs). Such "interference" is referred to herein as a conflict. As a reminder, a controlled attack refers to making a "normal" node into an attacker in order to train an ANN. A triggering node is the node deciding to turn a remote node into an attacker.

The techniques herein propose a distributed synchronization technique to allow for distributed synchronization between triggering nodes in the network. In particular, the techniques herein are directed to a distributed mechanism used to avoid conflicts that may take place when multiple routers trigger remote attacks in a network. The techniques specify a distributed approach whereby remote candidate attackers are exchanged between triggering nodes in order to determine potential conflicts taking into account the priority, signature, duration of the attacks but also the network topology to resolve conflicts thanks to dynamic scheduling.

Operationally, the following set of elements/devices may be defined:
RSA: Remote Scheduling Agent.
CSA: Central Scheduling Agent.
Also, the techniques define the following data:
R(i,j): Triggering router I in PAN_ID j (note that a triggering router is a router that selects a remote node to act as a jammer to generate a controlled attack).
C(n,j): remote node selected by a router R(i,j) to act as remote attacker.
D(C(n,j)): Duration of the controlled attack triggered by the selected node (C(n,j)).
P(C(n,j)): priority of the remote attack.
S(C(n,j)): signature of the remote attack.

Each router (e.g., such as a FAR in a LLN) hosting an ANN or other LM requiring training (local or remote) also hosts an RSA, in charge of coordinating his schedules with the other RSAs hosted on peer-routers. All of the RSA are also communicating with the CSA, in charge, when present, of the global synchronization of all remote controlled attacks schedules.

The techniques herein specify two approaches: centralized and distributed, according to various embodiments.

—Distributed Approach to Coordinate Attacks—

In some embodiments, the list of candidates C, C', or C", respectively, may be shared among a set of K routers that may perform similar tasks, such as triggering a controlled attack. This mechanism avoids any potential disturbance caused in neighboring networks by an attack triggered by a router not managing them. Furthermore, this also allows for the synchronization of the actions of different routers that share nodes in their respective networks.

In one embodiment, all routers configured to perform selection of remote "attackers" for a network N in order to train an ANN may register with a policy manager. Once a router computes a list of candidates C, it first sends a unicast IP message to the policy manager to retrieve the set of K routers for the network N (e.g., the list K may be retrieved once, and then checked upon the expiration of a configurable timer). In another embodiment, the list of routers K may be dynamically discovered using a routing extension. For example, should the router use the RPL protocol, such an extension may be of the form of a node metric attribute. In the case of OSPF, a novel OSPF Opaque LSA (Type 10 or 11) is specified indicating that the router is subject to performing remote attacks.

Once the set of K routers has been retrieved, the router sends the list of candidates to its peers. In one embodiment such a candidate list is sent using a unicast IP message. In another embodiment, a multicast message may be used for that purpose using a well-known multicast group. The message may include any or all of the following:

1.) the list of candidates C
2.) the type of remote attacks to be triggered
3.) (optional) the duration of the attack
4.) (optional) the attack schedule (i.e., when the attack will be performed and for which duration).

At least at the beginning, the candidate lists may be large (e.g., thousands of nodes) and exchanging such long lists among routers may be inefficient in terms of bandwidth. In this case, Bloom filters and counting Bloom filters can be used in order to convey such information in an efficient way. Moreover, those structures can be used for performing set union, intersection and difference with linear complexity. After collecting all the information from the other K−1 routers, candidates that could disturb their network are removed from C. Any temporally stored data from a node that is removed from C at this step may also be removed. The remaining nodes in C are then queried for knowing their availability to be attacked and/or initiate an attack. In absence of conflict, the list C is unchanged. If there is a "conflict" (i.e., two routers in the list K plan to perform overlapping attacks on a given node $N_i$, or overlapping attacks on two nodes such that triggered overlapping attacks may be detrimental to the dataset, for example, triggering attacks from two direct neighbors), then a distributed scheduling mechanism may be used to coordinate these attacks.

Once all the candidates in C have been queried, those that answered negatively are removed from the list of candidates and their temporally stored data is erased. If C is not empty, the candidate with the highest score $S\_\{N_j\}$ is chosen as the candidate to become an attacker or target. The data temporally stored from this chosen node is used for updating the histograms of feature values and the attack is triggered.

The set of FARs that could potentially trigger remote attacks in a $PAN\_ID_j$ may be discovered. Notably, if distributed ANNs or other LMs are used across multiple PANs under the same administrative domain (e.g., owned by a single company), it becomes necessary to discover all FARs in domains where interferences may exist, as described below. In one embodiment, each FAR may retrieve the set of these FARs by polling a remote NMS agent. In another embodiment, each FAR may retrieve the set of FARs by sending a novel IP multicast polling message to all FARs using a well-known multicast group G1. Upon receiving such a request, each FAR that potentially triggers remote attacks replies using a multicast IP message to all-FARs (multicast group G1) indicating that the FAR may potentially trigger remote attacks for the $PAN\_ID_j$. Note that there may be one multicast group for ALL FARs, or alternatively one multicast group address for each new PAN_ID (or administrative domain in general) allocated by the NMS.

At this point, each FAR has a list of all FARs for each PAN_ID it belongs to, called F(i,j).

The techniques herein specify a newly defined object RA(i,j) where i is the router ID in $PAN\_ID_j$ (Remote Attack) and includes list of TLVs:
C(n,j);
P(C(n,j)): Priority of the remote controlled attack;
D(C(n,j));
S(C(n,j));
Optional: target of the attack; and
Optional: attack-specific parameters (e.g., percentage of intercepted packets for a jammer).

RA(i,j) specifies the list of nodes that R(i,j) has selected to become remote attackers, along with the characteristics (duration, priorities, signature, etc.) of each attack.

Each time a router R(i,j) triggers a remote control attack, it may send a multicast IP message using the multicast group address G that comprises RA(i,j). Upon receiving a message containing an object RA(i,j) a router R(i',j) performs the following tasks:

Conflict Resolution Pseudo Code

IF RA(i,j) is empty the node R(i',j) has not planned any remote attacks. Therefore, a negative reply is sent back to the node R(i,j) (alternatively the implementation may choose to not send explicit negative feed-back as a way to indicate the absence of attack).

```
ELSE
    Call Conflict (RA(i,j), RA(i',j))
    IF the Conflict function returns a negative value then stop
    ELSE
        Call the Conflict_Resol( )
    END
END
```

Conflict(x,y) is the function used to determine if two routers are planning remote attacks that are conflicting. Notably, such a function may operate by simply making sure that the intersection of two attack lists is empty (i.e., the lists do not overlap). In a more sophisticated implementation, Conflict( ) will inspect the routing topology and also the neighbor lists, in order to determine if there exists any pair of remote nodes in one of the lists that may attack nodes provoking interferences. The neighbor table may be required if the routing protocol does not list a node that is in the vicinity if that node is not selected as a potential next hop (e.g., although the node 33 and 34 are in the vicinity from a radio perspective, a routing protocol such as RPL may not list 34 as a potential parent (or sibling) for the node 33).

In order to efficiently compute the Conflict( ) function, for each FAR it is important to keep track of all of the nodes belonging to other DAGs which can potentially interfere with its nodes. However, the L2 topology of the PAN is not directly available to a FAR. Therefore, in order to keep a full up-to-date state of the L2 adjacencies, the FAR must collect a large amount of information from its nodes in the DAG. A more efficient method may be for every node to export an update every time it establishes a layer-2 adjacency with a node belonging to a different DAG. This reduces both the amount of traffic in the DAG needed in order to make the L2 topology information available. Furthermore, in the centralized implementation of the techniques herein (see below), it decreases the amount of information to be transmitted between the RSA and the CSA. This is particularly important, as the uplink of the FAR is typically limited in terms of bandwidth.

In another embodiment herein, the Conflict( ) function can be computed without a FAR having to keep track of the physical topology of its DAG. In particular, whenever a node N(i,j) receives from its FAR a message instructing it to perform an attack, it will first issue a multi-network broadcast message containing its RA(i,j) information. Every node belonging to another DAG, but still in the vicinity domain of N(i,j) will receive the details of the pending attack. At this point, the nodes will forward such information to their own FAR. Of course, if no node belonging to a different DAG can receive such message, the possibility of a conflict is discounted.

Therefore, every FAR whose DAG is potentially involved by the attack is informed, and automatically receives a list of the nodes which may suffer from an interference. It can then compare its RA(i,j) list against such information and notifies the other FAR of any possible conflict.

Figure 5A:
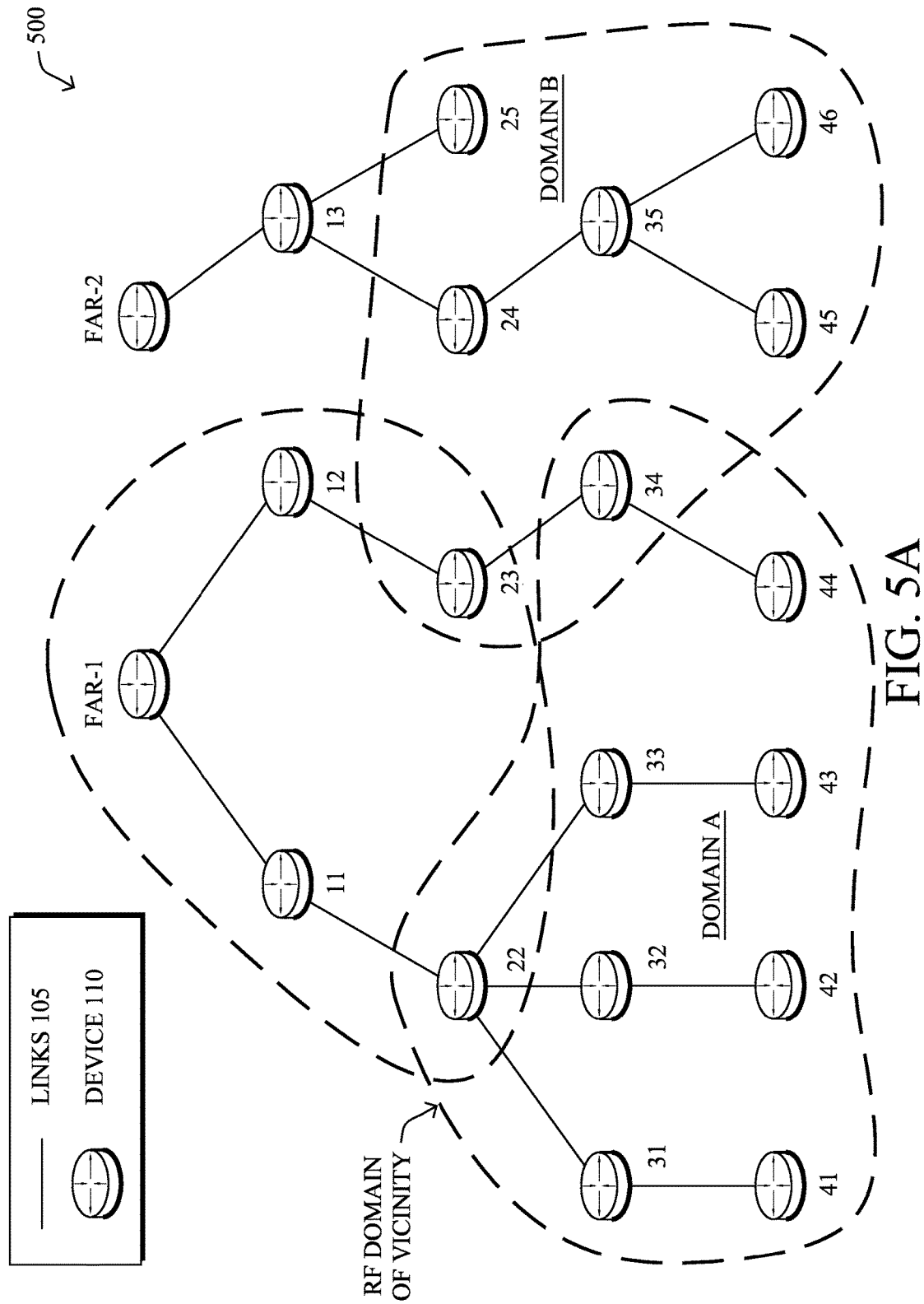
FIGS. 5A-5F illustrate an example of conflict resolution of conflicting attacks.

For the sake of illustration, as shown in FIG. 5A, the nodes 34 and 35 may choose to attack the nodes 23 and 24, which generates interferences in the learning process. In such a case, the Conflict( ) function returns a positive value. The Conflict( ) function may be even more sophisticated trying to determine if turning two nodes into remote attackers generates interferences because of side effects. For example, even though the attacks themselves may be totally orthogonal, one attack may trigger routing events that may have indirect consequences on another attacks, then compromising the training process. Another dimension used by the Conflict( ) function consists in analyzing the signature of the attack since some attacks may not interact with each other.

Figure 5B:
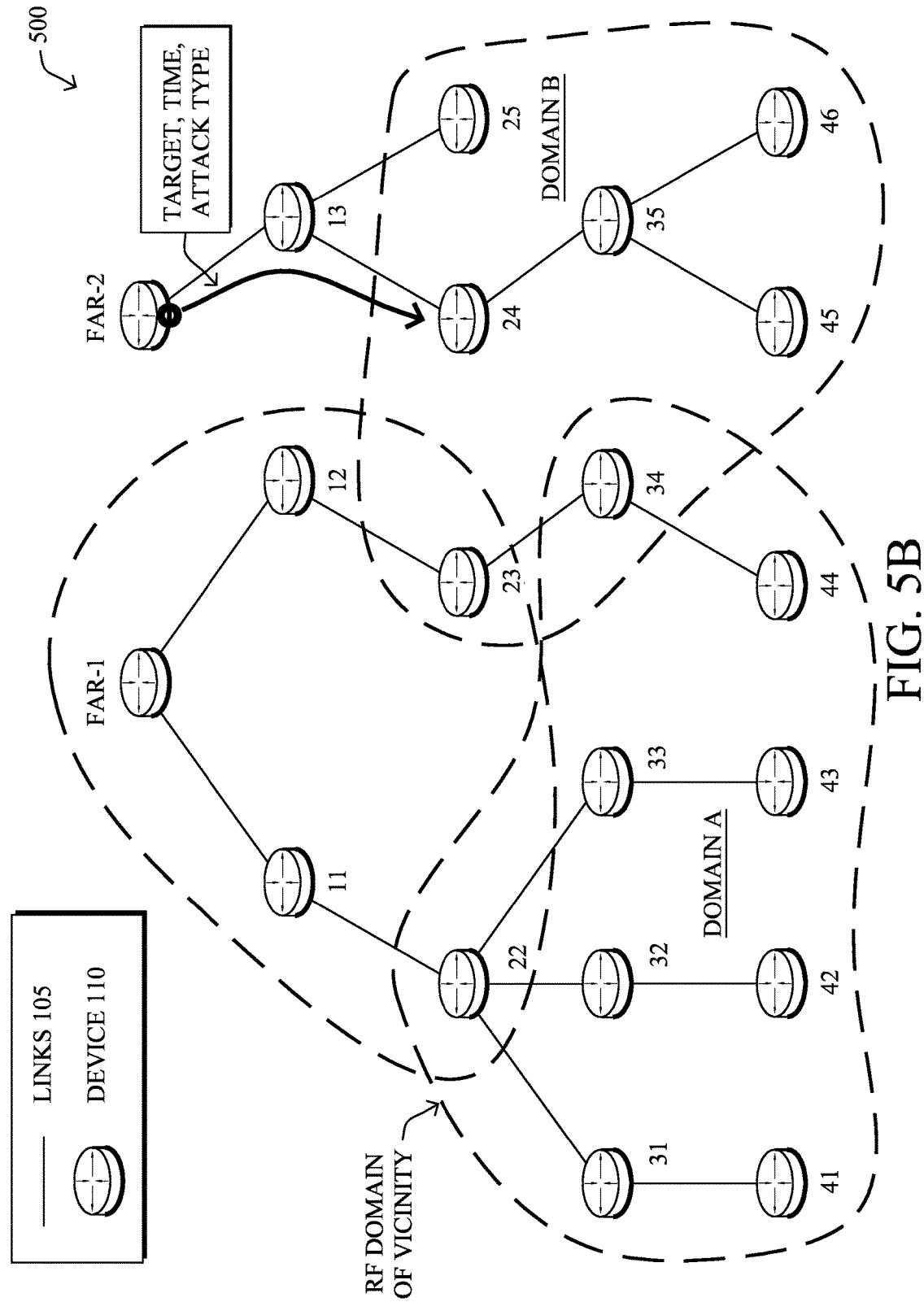
Figure 5C:
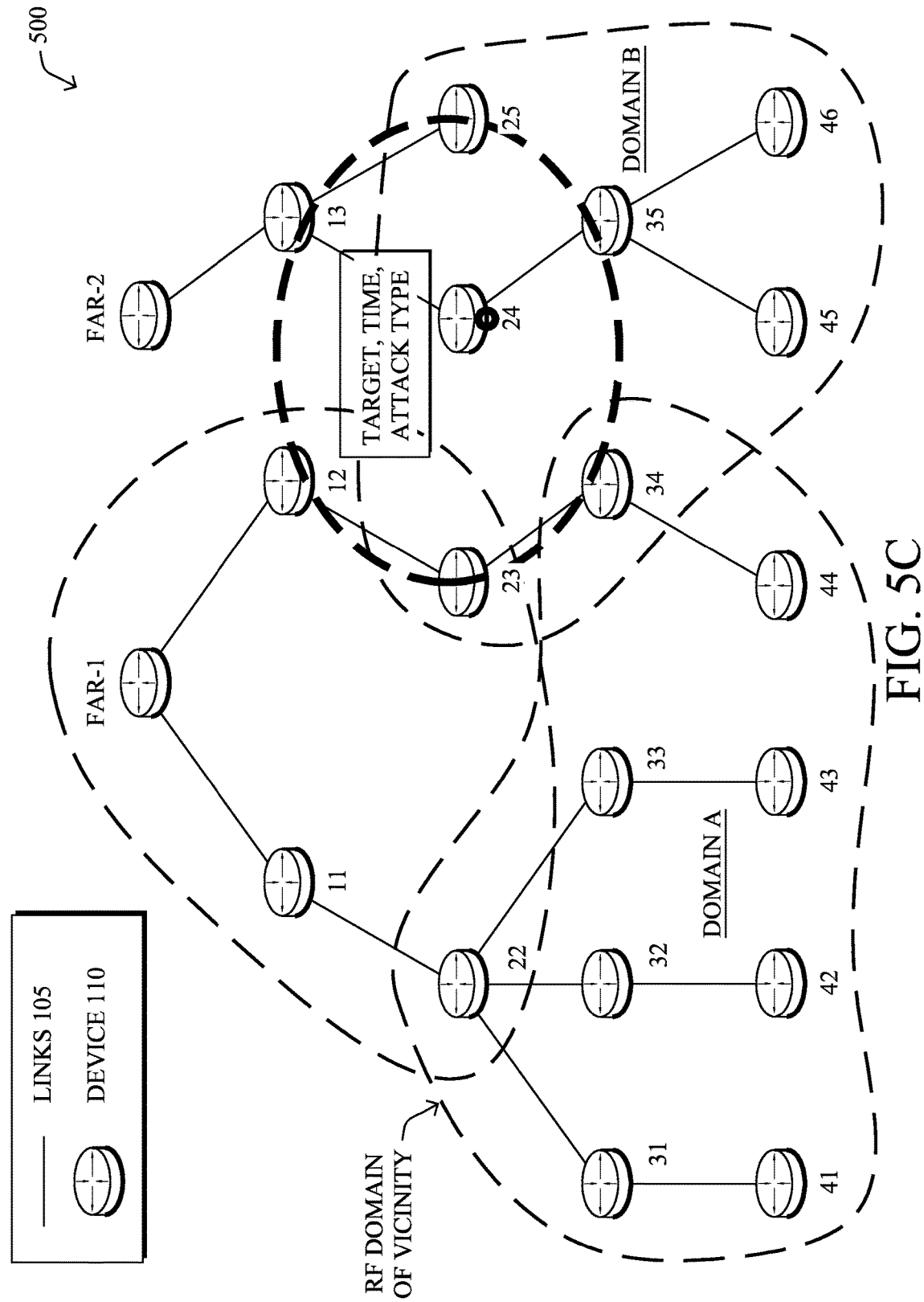
Figure 5D:
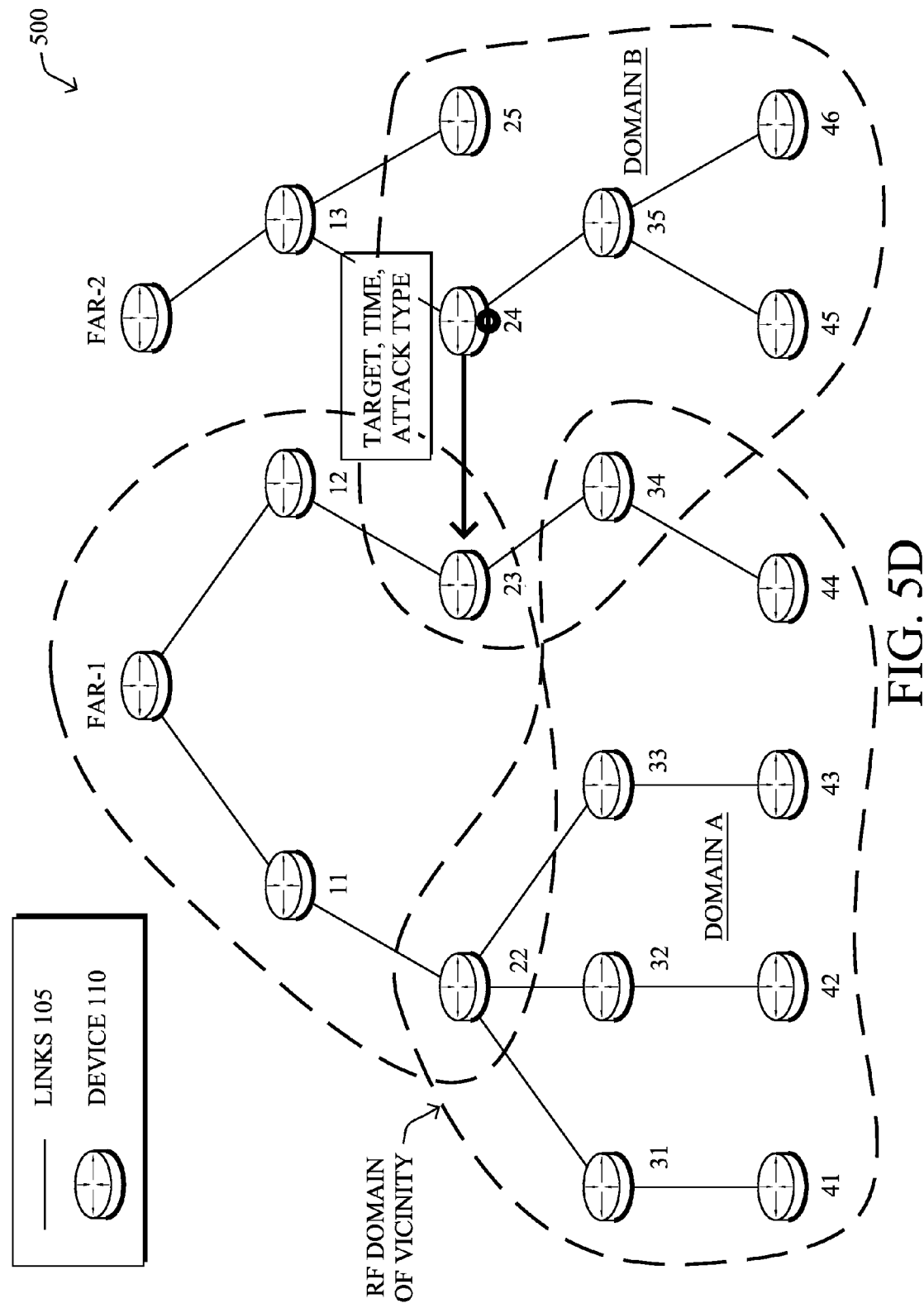
Figure 5E:
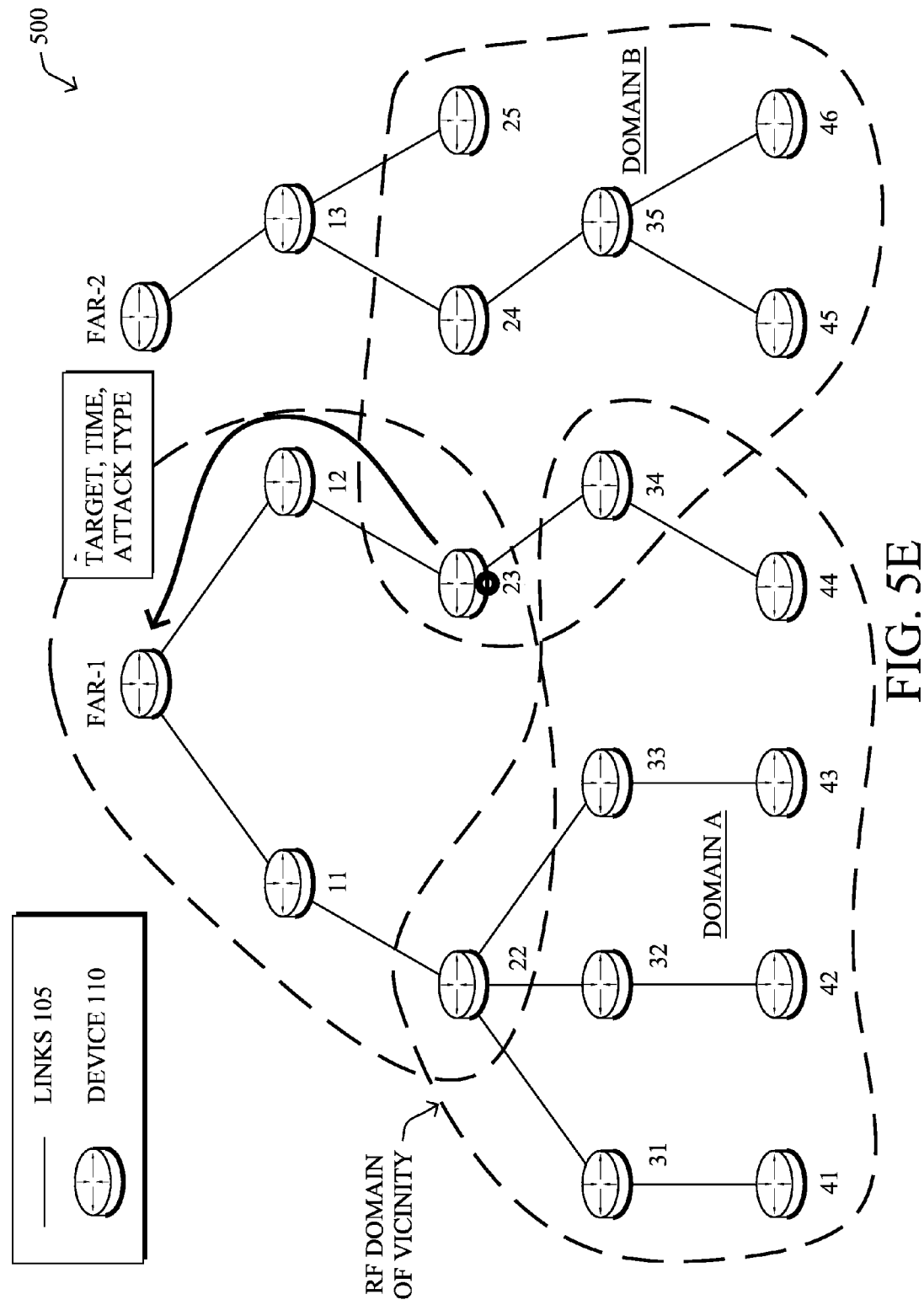
Figure 5F:
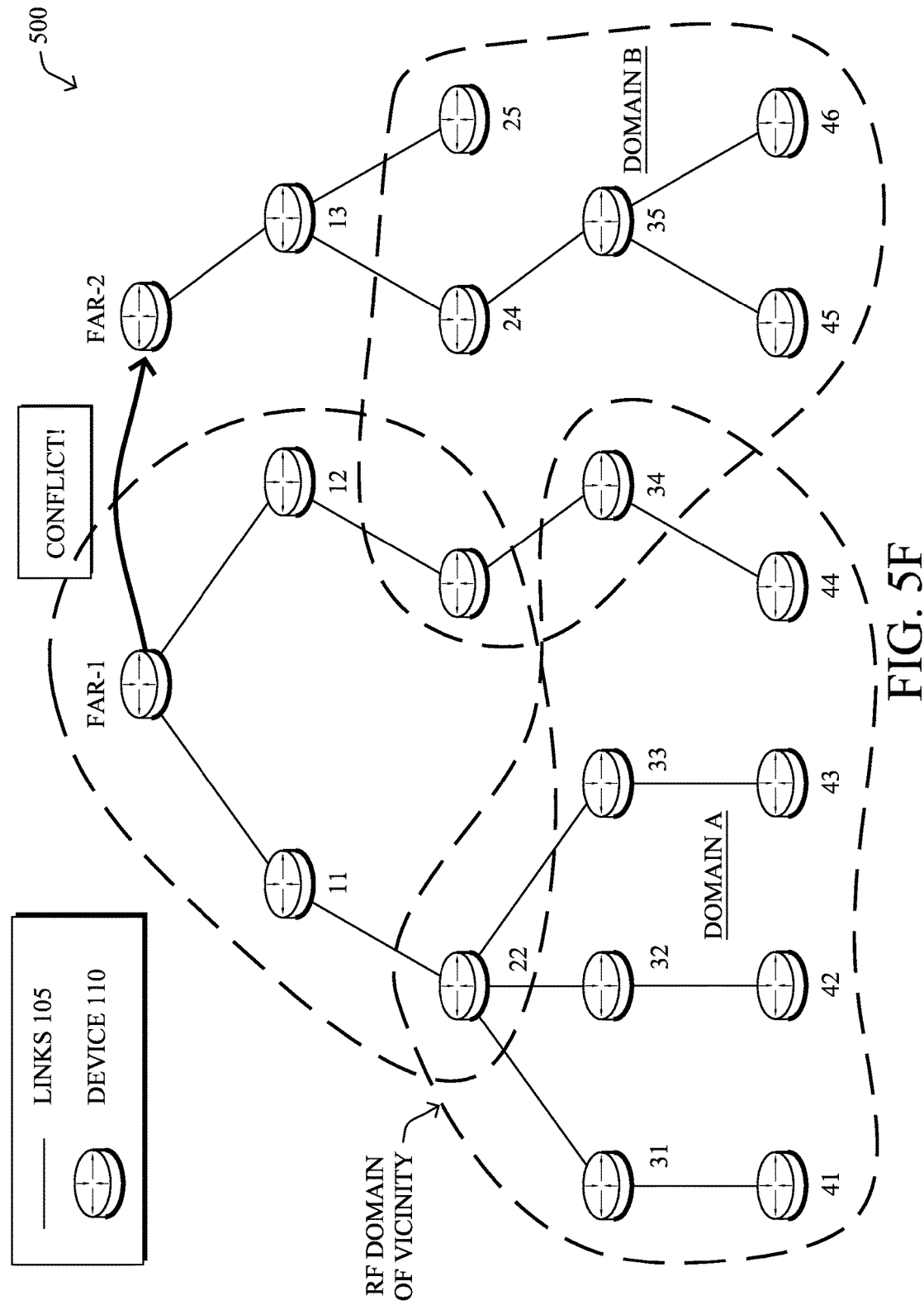

In yet another embodiment, the techniques herein specify a method allowing for a distributed detection of some form of conflict (still the resolution requires synchronization between the FARs). In this case, FAR2 will design node 24 as an attacker and send it the attack details, as depicted in FIG. 5B. In turn, node 24 will broadcast the same information, as shown in FIG. 5C. Such message will be picked up by node 23 in the other DAG, which will transmit such information to FAR1, as shown in FIGS. 5D-5E. At this point, FAR1 has both the attack details and the topological information and is able to determine whether a conflict with its own attack schedule exists. In this case, it can raise a conflict with FAR2, as shown in FIG. 5F.

Conflict_Resol( ) is the function used to resolve a conflict. Such a function may choose to defer the timing of remote controlled attacks. Using the Priority field, the Conflict_resol( ) function selects the attack of lower priority and adjusts the scheduling of that remote attack accordingly taking into account the duration of the higher priority attack. Note that the Priority value has to be comparable amongst different FARs and may contain information about the current learning status such as the current performance value of the LM, the current amount of information that has been already collected, the urgency of training the LM, and the importance of attacking this node for this FAR (e.g., by means of a score).

—Centralized Approach to Coordinating Attacks—

In yet another embodiment, all routers may use a centralized approach consisting in sending all RA(i,j) messages to the RSA, which hosts the algorithm and functions Conflict ( ) and Conflict_Resol( ) specified above. In the centralized approach, the mechanism is unchanged but all messages are sent using a unicast message to the RSA as opposed to being multicasted.

In order for the RSA to have consistent information allowing it to detect conflicts, the CSAs will require to receive both the routing topology and other tables such as the link-layer neighboring information. Such information can be provided to the RSA using a tunnel with one or more FARs (similar to a routing adjacency over a tunnel) or the FAR may alternatively send regular updates to the FAR.

—Attack Node Activation—

After a candidate node has been selected to initiate an attack from among the candidate list, the controller may send a newly defined unicast IPv6 message to the selected node. For example, a CoAP message that includes any or all of the following information may be sent:

An identifier for the type of attack to be performed.
Any additional context information (e.g., for the jammer, the target address).
Necessary code for performing such an attack, possibly in the form of a dynamic link library (DLL).
Scheduling information about the execution of the attack (e.g., in case of the jammer, a list of jamming periods). Notably, that may require a degree of synchronization in the network, as highlighted above. If this is not possible, the scheduling can be expressed by offsets with respect to the message reception time (this would imply a synchronization error depending on the variability of the delay between the central controller and the node).

In one embodiment, the code required to perform the attack is provided to the selected attacker(s). In another embodiment, the nature of the code to be used by the node (e.g., size) and/or the attack schedule (e.g., the duration of the attack or the period of time when the node should perform the attack will be performed) may be provided to a selected attacker. In this latter mode of operation, the device may also provide the required code/attack routine to the selected attacker, if and only if a reply to the request is positive (i.e., the selected attacker confirms that it is able to perform the attack). The node, in turn, will issue a newly defined response (e.g., in the form of a newly defined IPv6 message) specifying whether it has the capabilities for performing the required task. This may involve the selected node verifying its contextual information, in case the state stored by the controller is not up to date. In the case of the jammer, for example, this may entail checking that the target node is still reachable by the selected attacker with a strong enough signal power. If the controller receives a negative reply, then the selected attack node will be removed from the list of candidate attackers and a notification will be logged. In case of a positive response from the node, the router may also trigger the network monitoring infrastructure, to collect as much training data as possible about the initiated attack. This may involve, for example, activating local monitoring activities on the nodes that are closer to the selected one.

Assuming that a selected attack node is capable of initiating the controlled attack, the node will then begin the task of carrying out the required attack. To this end, it may use the contextual information that it has acquired during its normal activity. This is different from the option of rebooting the node with a completely different attack firmware, since in that case contextual information should be gathered again. In the case of a jammer, the node already has the information for attacking the target node on the right frequency and jamming can begin right away. In addition, routing information can be used to make the jamming attack more effective, by allowing the node to track central and vital nodes in the routing topology. Before actually starting the attack, the node may contact the controller/router by reporting a confirmation timestamp. Such a timestamp allows the monitoring infrastructure to correctly tag any data that will be collected from that time on (i.e., to associate the collected data with the controlled attack).

During the attack, the node should generally keep its information updated, so that it is able to use the network again as a communication mean. In case of the jammer, it will continue to collect routing and synchronization information. This may not be possible depending on the attack (e.g., a continuously emitting active jammer will never be able to receive any useful information). In this case, the node will have to join the network again whenever the attack is over.

In some embodiments, a selected attack node may be requested to operate in a mixed mode, when possible, being both an attacker and potentially also acting as an end node and/or a router. For example, if the attack consists in "jamming" signals, the attacker may "jam" some signals, while still sending user traffic locally generated and/or it may also act as a router for traffic in transit (e.g., for all traffic or high priority traffic, as specified in the request sent by the CP to the node, or according to local policy).

After performing the required activities, the selected attack node will send a report in the form of a newly specified unicast message to the device coordinating the attack and switch back to its regular behavior.

Figure 6:
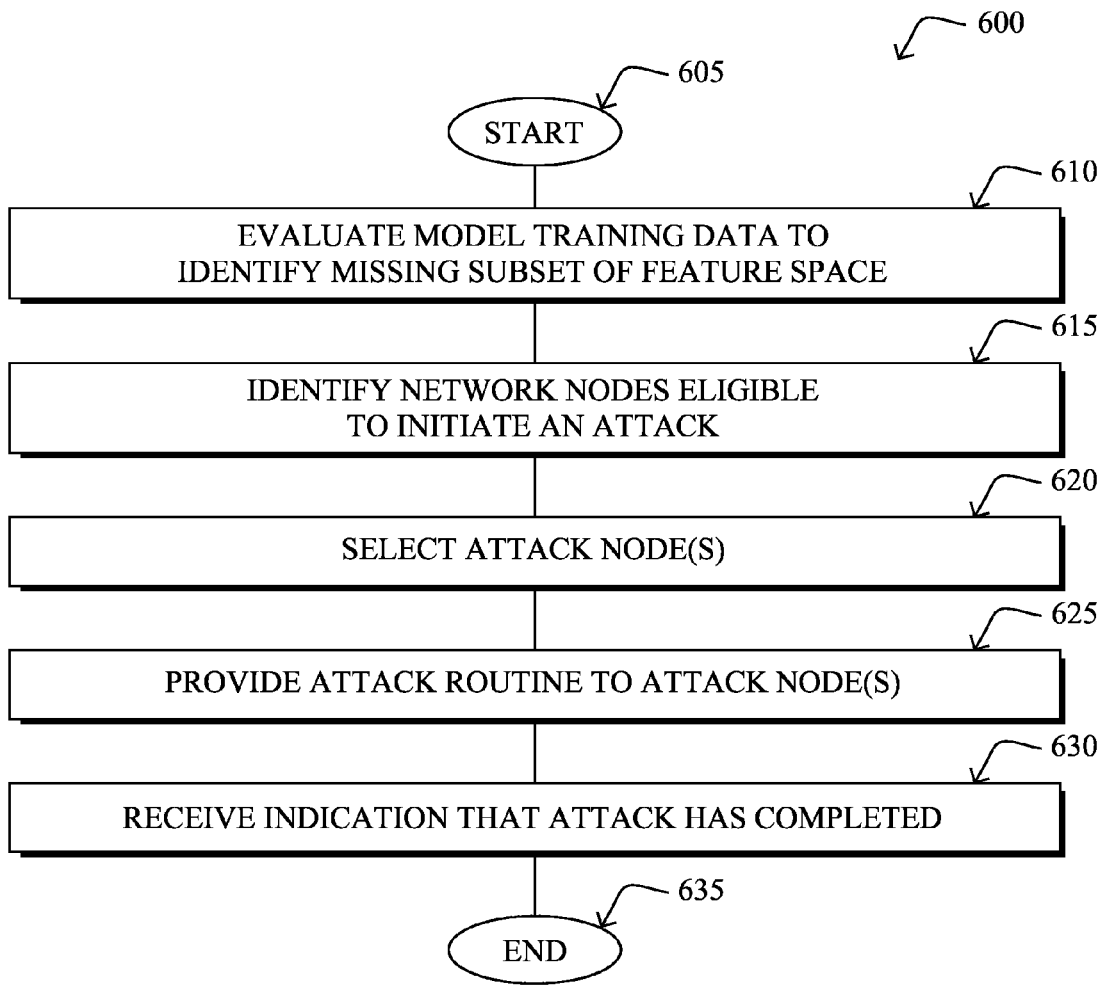
FIG. 6 illustrates an example simplified procedure for scheduling a network attack.

FIG. 6 illustrates an example simplified procedure for scheduling a controlled network attack, in accordance with one or more embodiments described herein. Procedure 600 begins at step 605 and continues on to step 610 where, as described in greater detail above, training data for a machine learning model is evaluated to identify a missing or underrepresented feature in the feature space of the training dataset (i.e., a feature subset of the feature space). For example, as shown above, histograms may be maintained to evaluate which features are well represented in the feature space training dataset and which features are not. In step 615, network nodes eligible to initiate a network attack are identified. As described in greater detail above, the eligible attack nodes may be identified based in part on whether the controlled attack from a particular node will cause the missing feature data to be generated in the network. Filtering of the eligible nodes may also be performed to eliminate from consideration nodes that do not have the requisite resources, etc. In step 620, one or more attack nodes are selected from amongst the eligible attack nodes to initiate the attack. In step 625, as detailed above, the attack routine is provided to the selected attack node(s). Notably, the provided attack routine may correspond to the actual instructions executed by an attack node (e.g., a DLL, etc.) and/or the parameters used by such a routine to initiate the attack. In step 630, a notification is received that the attack has completed and process 600 ends at step 635.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Illustratively, each of the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

The techniques described herein provide for activating a node as an attacker to train a learning machine. In particular, the techniques herein provide an efficient mechanism for training LMs for detecting DoS attacks in large-scale highly distributed networks (such as, but not limited to, LLNs). Such a mechanism reuses some selected nodes in the network to perform different types of denial of services attacks, while the rest of the nodes in the networks collect data that will be used for training the LM. This allows training the LM with no need to manually deploy special-purpose equipment for performing the DoS attack. In addition, the techniques herein allow selecting the nodes performing the attack in order to achieve maximum coverage of the input feature space of the LM, so as to maximize detection performance for every instantiation of a DoS attack.

The techniques described herein, therefore, provide for a smart selection of a targeted jammer. In particular, without such a mechanism, performing controlled attacks is extremely cumbersome requiring user intervention to determine which nodes should be used as controlled attackers but also complex distributed synchronized attacks between nodes in the network, taking into account a variety of parameters, and making the solution almost impossible to realize manually.

The techniques herein further provide for the distributed triggering of remote attacks in a network, thereby avoiding conflict issues that may compromise the entire LM training process (e.g., training an ANN or other LM to detect a DoS attack).

While there have been shown and described illustrative embodiments that provide for computer network anomaly training and detection using artificial neural networks, generally, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method, comprising:
evaluating, by a device, a set of training data for a machine learning model to identify a missing feature subset in a feature space of the set of training data;
identifying, by the device, a plurality of network nodes eligible to initiate an attack on a network to generate the missing feature subset at the machine learning model;
selecting, by the device from among the plurality of network nodes, one or more attack nodes based on the identified missing feature subset and on a traffic matrix associated with the plurality of network nodes, wherin the selected one or more attack nodes are based at least in part on a score of the identified missing feature subset, and the score is a value inversely proportional to a density of observations at a given point;
in response to selecting the one or more attack nodes, generating, by the device an attack routine to be sent to the selected one or more attack nodes that will generate the missing feature subset in the feature space of the set of training data;
in response to identifying the missing feature subset and selecting the one or more attack nodes that will cause the learning machine to generate the missing feature subset, transmitting, by the device, the attack routing to the one or more attack nodes;
instructing, by the device, the one or more attack nodes initiate the attack and generate the missing feature subset in the feature space of the set of training data upon receiving the attack routine; and
receiving, at the device from the one or more attack nodes, an indication that the attack has completed.

2. The method as in claim 1, wherein the machine learning model is an artificial neural network (ANN).

3. The method as in claim 1, further comprising:
sending a notification to a particular attack node that the particular attack node has been selected as an attacker; and
receiving, from the particular attack node, a confirmation that the particular attack node is capable of performing the attack.

4. The method as in claim 1, further comprising:
sending a notification to the one or more attack nodes that indicates a type and scheduled start time for the attack.

5. The method as in claim 1, wherein the attack routine is configured to cause the one or more attack nodes to perform a mixed mode of operation in which a particular attack node performs the attack for some communications and operates normally for other communications.

6. The method as in claim 1, further comprising:
generating the set of training data by randomly selecting attack nodes from among the plurality of network nodes to initiate network attacks.

7. The method as in claim 6, further comprising:
receiving the set of training data from the plurality of network nodes;
maintaining a first histogram of features from network nodes when unaffected by a network attack;
maintaining a second histogram of features from network nodes when affected by a network attack; and
using the first and second histograms to identify the missing feature subset.

8. The method as in claim 1, wherein the attack nodes are selected based on computing resource available at the attack nodes.

9. The method as in claim 1, further comprising:
determining that a particular network node in the plurality will be affected by two or more attacks that are scheduled to occur at the same time; and
scheduling execution times for the two or more attacks so as not to overlap.

10. The method as in claim 9, further comprising:
determining a set of one or more network nodes to be attacked in order to generate the missing feature subset;
providing the set of one or more network nodes to be attacked to a network device configured to initiate network attacks, wherein the network device configured to initiate network attacks compares the set of one or more network nodes to be attacked to a set of one or more network nodes to be attacked via a different attack.

11. The method as in claim 9, further comprising:
identifying the particular network device that will be affected by the two or more attacks by broadcasting information regarding the attacks to the plurality of network nodes.

12. The method as in claim 9, further comprising:
receiving network topology data from the plurality of network nodes; and
using the network topology data to identify the particular network device that will be affected by the two or more attacks.

13. The method as in claim 11, wherein the network nodes in the plurality span two or more computer networks.

14. The method as in claim 9, further comprising:
receiving a set of attack nodes as a unicast message, wherein the particular network node that will be affected by the two or more network attacks is determined by comparing the received set of attack nodes to the selected one or more attack nodes.

15. The method as in claim 9, wherein a particular attack is scheduled to execute first based on an attack priority value associated with the particular attack.

16. An apparatus, comprising:
one or more network interfaces to communicate in a computer network;
a processor coupled to the network interfaces and configured to execute one or more processes; and
a memory configured to store a process executable by the processor, the process when executed operable to:
evaluate a set of training data for a machine learning model to identify a missing a feature subset in a feature space of the set of training data;
identify a plurality of network nodes eligible to initiate an attack on a network to generate the missing feature subset;
select, from among the plurality of network nodes, one or more attack nodes based on the identified missing feature subset and on a traffic matrix associated with the plurality of network nodes, wherein the selected one or more attack nodes are based at least in part on a score of the identified missing feature subset, and the score is a value inversely proportional to a density of observations at a given point;
in response to selecting the one or more attack nodes, generate an attack routine to be sent to the selected one or more attack nodes that will generate the missing feature subset in the feature space of the set of training data;
in response to identification of the missing feature subset and selection of the one or more attack nodes that will cause the learning machine to generate the missing feature subset, transmit the attack routing to the one or more attack nodes;
instruct the one or more attack nodes to initiate the attack and generate the missing feature subset in the feature space of the set of training data upon receiving the attack routine from the apparatus; and
receive, from the one or more attack nodes, an indication that the attack has completed.

17. The apparatus as in claim 16, wherein the process when executed is further operable to:
generate the set of training data by randomly selecting attack nodes from among the plurality of network nodes to initiate network attacks;
receive the set of training data from the plurality of network nodes;
maintain a first histogram of features from network nodes when unaffected by a network attack;
maintain a second histogram of features from network nodes when affected by a network attack; and
use the first and second histograms to identify the missing feature subset.

18. The apparatus as in claim 16, wherein the process when executed is further operable to:
determine that a particular network node in the plurality will be affected by two or more attacks scheduled to occur at the same time; and
schedule execution of the two or more attacks not to overlap.

19. The apparatus as in claim 18, wherein the process when executed is further operable to:
determine a set of one or more network nodes to be attacked in order to generate the missing feature subset;
provide the set of one or more network nodes to be attacked to a network device configured to initiate network attacks, wherein the network device configured to initiate network attacks compare the set of one or more network nodes to be attacked to a set of one or more network nodes to be attacked via a different attack.

20. A tangible, non-transitory, computer-readable media having software encoded thereon, the software when executed by a processor operable to:
evaluate a set of training data for a machine learning model to identify a missing feature subset in a feature space of the set of training data;
identify a plurality of network nodes eligible to initiate an attack on a network to generate the missing feature subset;
select, from among the plurality of network nodes, one or more attack nodes based on the identified missing feature subset and on a traffic matrix associated with the plurality of network nodes, wherein the selected one or more attack nodes are based at least in part on a score of the identified missing feature subset, and the score is a value inversely proportional to a density of observations at a given point;
in response to selecting the one or more attack nodes, generate an attack routine to be sent to the selected one or more attack nodes that will generate the missing feature subset in the feature space of the set of training data;
in response to identification of the missing feature subset and selection of the one or more attack nodes that will cause the learning machine to generate the missing feature subset in the feature space of the set of training data;
in response to identification of the missing feature subset and selection of the one or more attack nodes that will cause the learning machine to generate the missing feature subset, transmit the attack routine to the one or more attack nodes;
instruct the one or more attack nodes to initiate the attack and generate the missing feature subset in the feature space of the set of training data upon receiving the attack routine; and
receive, from the one or more attack nodes, and indication that the attack has completed.

* * * * *

UNITED STATES PATENT AND TRADEMARK OFFICE
CERTIFICATE OF CORRECTION

PATENT NO. : 10,356,111 B2
APPLICATION NO. : 14/164467
DATED : July 16, 2019
INVENTOR(S) : Di Pietro et al.

It is certified that error appears in the above-identified patent and that said Letters Patent is hereby corrected as shown below:

In the Specification

Column 12, Line 61, please amend as shown:
are an example of such a dataset that is widely used in In the Claims Claim 1, Column 23, Line 61, please amend as shown:
associated with the plurality of network nodes, wherein Claim 1, Column 24, Line 7, please amend as shown:
subset, transmitting, by the device, the attack routine to Claim 8, Column 24, Line 49, please amend as shown:
selected based on computing resources available at the attack Claim 16, Column 25, Line 32, please amend as shown:
model to identify a missing feature subset in a Claim 16, Column 25, Line 53, please amend as shown:
missing feature subset, transmit the attack routine to Claim 19, Column 26, Line 22, please amend as shown:
ured to initiate network attacks compares the set of one Claim 20, Column 26, Lines 48-52, please delete:
"in response to identification of the missing feature subset
and selection of the one or more attack nodes that will
cause the learning machine to generate the missing Signed and Sealed this
Twenty-first Day of July, 2020

Andrei Iancu
*Director of the United States Patent and Trademark Office* feature subset in the feature space of the set of training data;"